(12) United States Patent
Nakamura

(10) Patent No.: US 12,504,303 B2
(45) Date of Patent: Dec. 23, 2025

(54) STEERING DEVICE

(71) Applicant: HONDA MOTOR CO., LTD., Tokyo (JP)

(72) Inventor: Kotaro Nakamura, Tokyo (JP)

(73) Assignee: HONDA MOTOR CO., LTD, Tokyo (JP)

( * ) Notice: Subject to any disclaimer, the term of this patent is extended or adjusted under 35 U.S.C. 154(b) by 225 days.

(21) Appl. No.: 18/523,916

(22) Filed: Nov. 30, 2023

(65) Prior Publication Data

US 2024/0183690 A1 Jun. 6, 2024

(30) Foreign Application Priority Data

Dec. 2, 2022 (JP) ................................. 2022-193705

(51) Int. Cl.
*G01D 5/24* (2006.01)
*B62D 1/04* (2006.01)
*B62D 1/06* (2006.01)

(52) U.S. Cl.
CPC ............. *G01D 5/2405* (2013.01); *B62D 1/04* (2013.01); *B62D 1/046* (2013.01); *B62D 1/06* (2013.01)

(58) Field of Classification Search
CPC ........ G01D 5/2405; B62D 1/06; B62D 1/046; B62D 1/04; H03K 2217/960705; H03K 2217/96073; H03K 2217/96078; H03K 17/9622; B60W 40/09; B60W 2420/24
See application file for complete search history.

(56) References Cited

U.S. PATENT DOCUMENTS

| 10,598,516 B2 * | 3/2020 | Matsumura .............. G01D 5/24 |
| 2017/0129499 A1 | 5/2017 | Odate |
| 2018/0087929 A1 | 3/2018 | Matsumura |

(Continued)

FOREIGN PATENT DOCUMENTS

| JP | 2017087883 A | 5/2017 |
| JP | 2018047816 A | 3/2018 |

(Continued)

OTHER PUBLICATIONS

Notification of Reasons for Refusal issued Sep. 17, 2024 in the JP Patent Application No. 2022-193705.

*Primary Examiner* — Amy He
(74) *Attorney, Agent, or Firm* — CKC & PARTNERS CO., LLC

(57) ABSTRACT

A steering device includes a measurement circuit which measures electrostatic capacitance of an electrode provided to a steering wheel, and a grip determination device which determines presence/absence of gripping of the steering wheel based on a measurement value Ch_d from the measurement circuit. The grip determination device includes a capacitance threshold setter which sets a reference value Ch_0 for the electrostatic capacitance of the electrode, and a determiner which determines presence/absence of gripping of the steering wheel based on a difference between the measurement value Ch_d and reference value Ch_0. The capacitance threshold setter changes the reference value Ch_0(n) according to a change amount dCh_0(n) in the measurement value when the absolute value |a(n)| for the slope of the filter value Ch_d_f(n) of the measurement value was less than a predetermined slope threshold a_th.

6 Claims, 8 Drawing Sheets

(56) References Cited

U.S. PATENT DOCUMENTS

2020/0298881 A1 9/2020 Odate et al.
2021/0206230 A1 7/2021 Ishikawa

FOREIGN PATENT DOCUMENTS

| JP | 2018075849 A | 5/2018 |
| JP | 2018120757 A | 8/2018 |
| JP | 2020060313 A | 4/2020 |
| JP | 2024048044 A | 4/2024 |
| WO | 2017168540 A1 | 10/2017 |

* cited by examiner

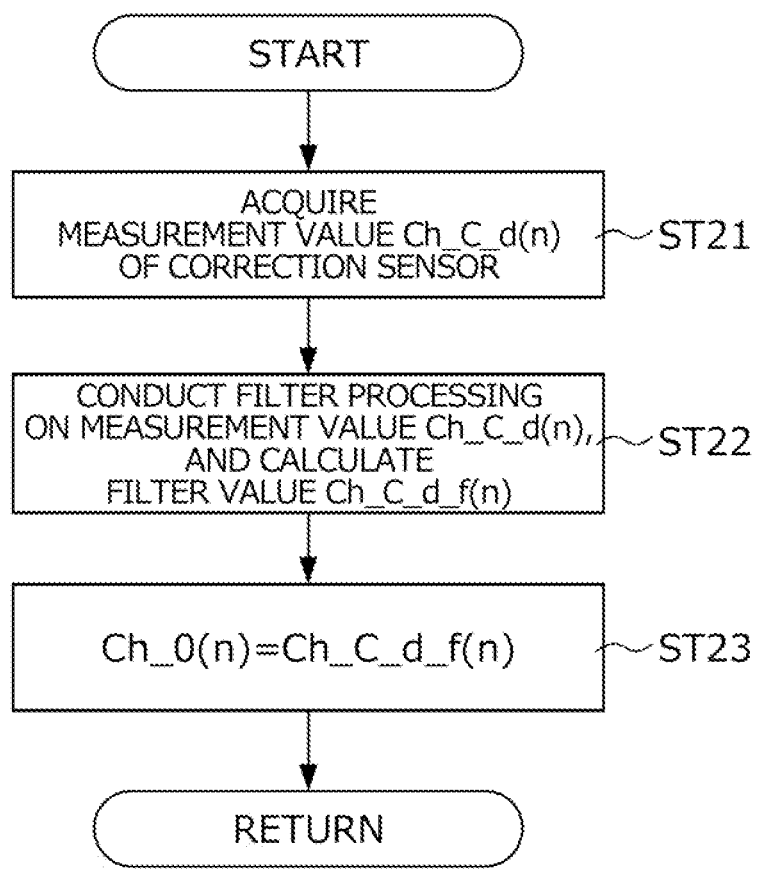

STEERING DEVICE

This application is based on and claims the benefit of priority from Japanese Patent Application No. 2022-193705, filed on 2 Dec. 2022, the content of which is incorporated herein by reference.

BACKGROUND OF THE INVENTION

Field of the Invention

The present invention relates to a steering device. In more detail, the present invention relates to a steering device including a steering wheel, and a grip determination device which determines the presence/absence of gripping of the steering wheel by a driver.

Related Art

In recent years, the equipping to vehicles of driving assistance devices which assist driving of a vehicle by the driver, such as a lane maintaining function, lane deviation suppressing function, lane change function and preceding vehicle following function has been advancing. With a vehicle equipped with such driving assistance devices, for example, in a case of determining the presence/absence of gripping of the steering wheel by the driver by way of a grip determination device such as that shown in Patent Document 1, and determining as not being gripped, gripping of the steering wheel may be prompted to the driver, or the driving assistance function may be cancelled while traveling.

With the grip determination device shown in Patent Document 1, the presence/absence of gripping of the steering wheel by the driver is determined based on a comparison between the output value of an electrostatic capacitance sensor provided to the steering wheel and a predetermined threshold.

Patent Document 1: Japanese Unexamined Patent Application, Publication No. 2017-87883

SUMMARY OF THE INVENTION

However, the output value of the electrostatic capacitance sensor varies according to the temperature around the steering wheel. For this reason, in the case of fixing the threshold irrespective of the change in environmental state around the steering wheel, there is a risk of misjudgment. Therefore, with the invention disclosed in Patent Document 1, the threshold for the output value of the electrostatic capacitance sensor changes based on the detection value or estimated value for the ambient temperature of the steering wheel.

However, with the invention shown in Patent Document 1, it is necessary to also provide a temperature sensor in addition to the electrostatic capacitance sensor. In addition, the output value of the electrostatic capacitance sensor varies also according to the humidity, not only the temperature of the surroundings. For this reason, in order to also consider the humidity of the surroundings, a humidity sensor also becomes necessary in addition to the temperature sensor.

The present invention has an object of providing a steering device which can prevent misjudgment due to a change in environmental situation around the steering wheel by a simple configuration, and thus has an object of contributing to the development of a sustainable transportation system.

A steering device (for example, the steering device 1 described later) according to a first aspect of the present invention includes: a steering wheel (for example, the steering wheel 2 described later) which accepts a steering operation of a vehicle by a driver; a measurement device (for example, the measurement circuit 42 described later) which measures an electrostatic capacitance of an electrode (for example, the electrode 40 described later) provided to the steering wheel; and a grip determination device (for example, the grip determination device 80 described later) which determines presence/absence of gripping of the steering wheel based on a measurement value from the measurement device, in which the grip determination device includes a capacitance threshold setter (for example, the capacitance threshold setter 82 described later) which sets a capacitance threshold (for example, the reference value $Ch\_0$ or grip determination threshold $Ch\_th$ described later) for electrostatic capacitance of the electrode; and a determiner (for example, the determiner 81 described later) which determines presence/absence of gripping of the steering wheel based on a difference or comparison between the measurement value and the capacitance threshold, and in which the capacitance threshold setter changes the capacitance threshold according to a change amount of the measurement value when the absolute value for slope of the measurement value is less than a predetermined slope threshold.

According to a second aspect of the present invention, in this case, it is preferable for the capacitance threshold setter to increase the capacitance threshold in a case of an absolute value for slope of the measurement value in a predetermined determination period being less than the slope threshold (for example, the slope threshold $a\_th$ described later) and the measurement value increasing in the determination period; decrease the capacitance threshold in a case of the absolute value for slope of the measurement value in the predetermined period being less than the slope threshold and the measurement value decreasing in the determination period; and maintain the capacitance threshold constant in a case of the absolute value for the slope of the measurement value in the determination period being at least the slope threshold.

According to a third aspect of the present invention, in this case, it is preferable for the determiner to determine presence/absence of gripping of the steering wheel based on a capacitance differential value (for example, the capacitance differential value $\Delta C$ described later) obtained by subtracting a reference value (for example, the reference value $Ch\_0$ described later) which is the capacitance threshold from the measurement value.

According to a fourth aspect of the present invention, in this case, it is preferable for the determiner to determine presence/absence of gripping of the steering wheel by comparing the measurement value and a grip determination threshold (for example, the grip determination threshold $Ch\_th$ described later) which is the capacitance threshold.

A steering device (for example, the steering device 1A described later) according to a fifth aspect of the present invention includes: a steering wheel (for example, the steering wheel 2 described later) which accepts a steering operation of a vehicle by a driver; a measurement device (for example, the measurement circuits 42A, 52A, 62A, 72A described later) which measures an electrostatic capacitance of an electrode (for example, the electrodes 40A, 50A, 60A, 70A described later) provided to the steering wheel; a plurality of the measurement devices (for example, the measurement circuits 42A, 52A, 62A, 72A described later) having different installation positions of the electrode; and a grip determination device (for example, the grip determination device 80A described later) which determines presence/ absence of gripping of the steering wheel based on measurement values from a plurality of the measurement devices, in which a detection target region is established for each of the measurement devices on the steering wheel, and the grip determination device includes a capacitance threshold setter (for example, the capacitance threshold setter 82A described later) which sets a capacitance threshold (for example, the reference value Ch_0 or grip determination threshold Ch_th described later) for electrostatic capacitance of the electrode; and a determiner (for example, the determiner 81A described later) which determines presence/absence of gripping for each of the detection target regions based on a difference or comparison between the measurement value and the capacitance threshold, and in which among the plurality of the measurement devices, the capacitance threshold setter sets a device establishing a region determined as not being gripped by the determiner as the detection target region as a correction measurement device, and sets the capacitance threshold based on the measurement value from the correction measurement device.

According to a sixth aspect of the present invention, in this case, it is preferable for the capacitance threshold setter to set the capacitance threshold so as to equal the measurement value from the correction measurement device.

According to a seventh aspect of the present invention, in this case, it is preferable for the determiner to determine presence/absence of gripping of the detection target region based on a capacitance differential value (for example, ΔCh_R, ΔCh_L, ΔCh_U, ΔCh_D described later) obtained by subtracting the reference value (for example, the reference value Ch_0 described later) which is the capacitance threshold from the measurement value.

According to an eighth aspect of the present invention, in this case, it is preferable for the determiner to determine presence/absence of gripping in the detection target region by comparing between the measurement value and the grip determination threshold (for example, the grip determination threshold Ch_th described later), which is the capacitance threshold.

A steering device (for example, the steering device 1A described later) according to a ninth aspect of the present invention includes: a steering wheel (for example, the steering wheel 2 described later) which accepts a steering operation of a vehicle by a driver; a measurement device (for example, the measurement circuits 42A, 52A, 62A, 72A described later) which measures an electrostatic capacitance of an electrode (for example, the electrodes 40A, 50A, 60A, 70A described later) provided to the steering wheel; a correction measurement device (for example, the correction measurement circuit 92B described later) which measures electrostatic capacitance of a correction electrode (for example, the correction electrode 90B described later) provided on or near the steering wheel at a position which cannot be gripped by the driver; and a grip determination device (for example, the grip determination device 80B described later), which determines presence/absence of gripping of the steering wheel based on measurement values form the measurement device and the correction measurement device, in which the grip determination device includes: a grip determination device includes a capacitance threshold setter (for example, the capacitance threshold setter 82B described later) which sets a capacitance threshold (for example, the reference value Ch_0 or grip determination threshold Ch_th described later) for electrostatic capacitance of the electrode; and a determiner (for example, the determiner 81A described later) which determines presence/absence of gripping of the steering wheel based on a difference or comparison between the measurement value from the measurement device and the capacitance threshold, and in which the capacitance threshold setter sets the capacitance threshold based on the measurement value from the correction measurement device.

According to a tenth aspect of the present invention, in this case, it is preferable for the capacitance threshold setter to set the capacitance threshold so as to equal the measurement value from the correction measurement device.

According to an eleventh aspect of the present invention, in this case, it is preferable for the determiner to determine presence/absence of gripping in the detection target region based on the capacitance differential value (for example, ΔCh_R, ΔCh_L, ΔCh_U, ΔCh_D described later) obtained by subtracting the reference value (for example, the reference value Ch_0 described later) which is the capacitance threshold from the measurement value.

According to a twelfth aspect of the present invention, in this case, it is preferable for the determiner to determine presence/absence of gripping in the detection target region by comparing between the measurement value and the grip determination threshold (for example, the grip determination threshold Ch_th described later), which is the capacitance threshold.

With the steering device according to the first aspect of the present invention, he grip determination device includes the capacitance threshold setter which sets the capacitance threshold for the electrostatic capacitance of the electrode provided to the steering wheel; and the determiner which determines the presence/absence of gripping of the steering wheel based on a difference or a comparison between the measurement value of the electrode from the measurement device and the capacitance threshold. Herein, when the driver grips the steering wheel, the measurement value of electrostatic capacitance by the measurement circuit increases, and the difference between the measurement value and capacitance threshold also increases. For this reason, the steering device can determine the presence/absence of gripping of the steering wheel based on the difference between the measurement value and capacitance threshold. In addition, the measurement value of the electrostatic capacitance by the measurement circuit also varies when the environmental state such as the temperature and humidity around the steering wheel varies; however, the change rate thereof is slower than the change rate of the measurement value when the driver brings their hand towards and away from the steering wheel. Therefore, the capacitance threshold setter causes the capacitance threshold to vary according to the change amount of the measurement value when the absolute value of the slope of the measurement value value is less than the slope threshold, i.e. when the change rate of the measurement value is gentle. Since it is thereby possible to eliminate the change amount of the measurement value caused by the change in environmental state around the steering wheel from the difference between the measurement value and capacitance threshold, it is possible to prevent misjudgment due to fluctuation in the environmental state around the steering wheel, and thus can contribute to the development of a sustainable transportation system. In addition, with the present invention, since there is no need to provide a sensor for detecting the environmental state around the steering wheel, it is possible to prevent misjudgment with a simpler configuration than conventional.

In the second aspect of the present invention, the capacitance threshold setter, in the case of the absolute value for the slope of the measurement value in a predetermined determination period being less than the slope threshold and the measurement value increasing in this determination period, increases the capacitance threshold, and in the case of the absolute value for the slope of the measurement value in a predetermined determination period being less than the slope threshold and the measurement value increasing in this determination period, decreases the capacitance threshold. It is thereby possible to appropriately vary the capacitance threshold so that the difference between the measurement value and capacitance threshold becomes constant irrespective of a change in the environmental state around the steering wheel. In addition, in the case of the absolute value for the slope of the measurement value in the determination period being at least the slope threshold, the capacitance threshold setter determines that the change in this measurement value is due to the driver bringing the hand towards or distancing from the steering wheel, and maintains the capacitance threshold constant. Consequently, according to the present invention, it is possible to divide the change amount of measurement value in the electrostatic capacitance into being caused by a change in environmental state, and caused by the driver bringing the hand towards or distancing from the steering wheel.

In the third aspect of the present invention, the determiner determines the presence/absence of gripping of the steering wheel based on the capacitance differential value obtained by subtracting the reference value which is the capacitance threshold from the measurement value. Consequently, according to the present invention, since it is possible to make the capacitance differential value constant irrespective of the change in environmental state around the steering wheel, it is possible to determine the presence/absence of gripping precisely.

In the fourth aspect of the present invention, the determiner determines the presence/absence of gripping of the steering wheel by comparing between the measurement value and the grip determination threshold which is the capacitance threshold. Consequently, according to the present invention, since it is possible to make the difference between the capacitance differential value and the grip determination threshold constant irrespective of a change in the environmental state around the steering wheel, it is possible to determine the presence/absence of gripping precisely.

In the fifth aspect of the present invention, the steering device includes a plurality of measurement devices for electrostatic capacitance having different installation positions of electrodes on the steering wheel; and the grip determination device which determines the presence/absence of gripping of the steering wheel based on the measurement values from the plurality of measurement devices. In addition, a detection target region is established for every measurement device on the steering wheel, and the grip determination device includes: the capacitance threshold setter which sets the capacitance threshold for the electrostatic capacitance of the electrode; and the determiner which determines the presence/absence of gripping for every detection target region based on the difference of a comparison between the measurement value and the capacitance threshold. Herein, the measurement values of the measurement devices establishing this gripped region as the detection target region increase when the driver grips the steering wheel at any of the plurality of detection target regions, and thus the difference between the measurement value and capacitance threshold also increases. For this reason, with the steering device, it is possible to determine the presence/absence of gripping of the steering wheel based on the difference or comparison between the measurement value and capacitance threshold. Herein, when the environmental state around the steering wheel changes, the measurement values of the electrostatic capacitance from these measurement devices also change. At this time, since it is assumed that the hand of the driver is distanced in a region determined as not being gripped by the determiner, the measurement value of the measurement device with this region set as the detection target region comes to reflect the environmental state around the steering wheel. Therefore, the capacitance threshold setter establishes a device with the region determined as not being gripped by the determiner among the plurality of measurement device as the detection target region as a correction measurement device, and sets the capacitance threshold based on the measurement value from this correction measurement device. Consequently, according to the present invention, since it is possible to make the difference between the measurement value and capacitance threshold constant irrespective of a change in the environmental state around the steering wheel, it is possible to prevent misjudgment due to variation in the environmental state around the steering wheel, and thus possible to contribute to the development of a sustainable transportation system. In addition, with the present invention, since there is no need to provide a sensor for detecting the environmental state around the steering wheel, it is possible to prevent misjudgment with a simpler configuration than conventional.

In the sixth aspect of the present invention, the capacitance threshold setter can make the difference between the measurement value and capacitance threshold constant irrespective of change in the environmental state around the steering wheel by setting the capacitance threshold so as to be equal to the measurement value from the correction measurement device; therefore, it is possible to prevent misjudgment due to variation in the environmental state around the steering wheel.

In the seventh aspect of the present invention, the determiner determines the presence/absence of gripping of the steering wheel based on the capacitance differential value obtained by subtracting the reference value which is the capacitance threshold from the measurement value. Consequently, according to the present invention, since it is possible to make the capacitance differential value constant irrespective of change in the environmental state around the steering wheel, it is possible to determine the presence/absence of gripping precisely.

In the eighth aspect of the present invention, the determiner determines the presence/absence of gripping of the steering wheel by comparing between the measurement value and the grip determination threshold which is the capacitance threshold. Consequently, according to the present invention, since it is possible to make the difference between the capacitance differential value and the grip determination threshold constant irrespective of change in the environmental state around the steering wheel, it is possible to determine the presence/absence of gripping precisely.

According to the ninth aspect of the present invention, the steering device includes: the measurement device which measures the electrostatic capacitance of an electrode provided to the steering wheel; the correction measurement device which measures the electrostatic capacitance of a correction electrode provided on or near the steering wheel and at a position which cannot be gripped by the driver; and the grip determination device which determines the presence/absence of gripping of the steering wheel based on the measurement values from the measurement device and the correction measurement device. Herein, when the driver grips the steering wheel, the measurement value of the measurement device increases, and thus the difference between the measurement value and the capacitance threshold also increases; however, the measurement value of the correction measurement device hardly changes. For this reason, with the steering device, it is possible to determine the presence/absence of gripping of the steering wheel based on the difference or comparison between the measurement value and the capacitance threshold. Herein, when the environmental state around the steering wheel changes, the measurement values of the electrostatic capacitance from the measurement device and correction measurement device also change. At this time, the measurement value of the correction measurement device becomes a value reflecting the environmental state around the steering wheel. Therefore, the capacitance threshold setter sets the capacitance threshold based on the measurement value from the correction measurement device. Consequently, according to the present invention, since it is possible to make the difference between the measurement value from the measurement device and the capacitance threshold constant irrespective of a change in the environmental state around the steering wheel, it is possible to prevent misjudgment due to variation in the environmental state around the steering wheel, and thus possible to contribute to the development of a sustainable transportation system. In addition, with the present invention, since there is no need to provide a sensor for detecting the environmental state around the steering wheel, it is possible to prevent misjudgment with a simpler configuration than conventional.

In the tenth aspect of the present invention, the capacitance threshold setter can make the difference between the measurement value and the capacitance threshold constant irrespective of change in the environmental state around the steering wheel by setting the capacitance threshold so as to be equal to the measurement value from the correction measurement device; therefore, it is possible to prevent misjudgment due to variation in the environmental state around the steering wheel.

In the eleventh aspect of the present invention, the determiner determines the presence/absence of gripping of the steering wheel based on the capacitance differential value obtained by subtracting the reference value which is the capacitance threshold from the measurement value. Consequently, according to the present invention, since it is possible to make the capacitance differential value constant irrespective of change in the environmental state around the steering wheel, it is possible to determine the presence/absence of gripping precisely.

In the twelfth aspect of the present invention, the determiner determines the presence/absence of gripping of the steering wheel by comparing between the measurement value and the grip determination threshold which is the capacitance threshold. Consequently, according to the present invention, since it is possible to make the difference between the capacitance differential value and the grip determination threshold constant irrespective of change in the environmental state around the steering wheel, it is possible to determine the presence/absence of gripping precisely.

BRIEF DESCRIPTION OF THE DRAWINGS

FIG. 8 is a flowchart showing a specific sequence of reference value setting processing of setting a reference value.

DETAILED DESCRIPTION OF THE INVENTION

First Embodiment

Hereinafter, a steering device according to a first embodiment of the present invention will be explained while referencing the drawings.

Figure 1:
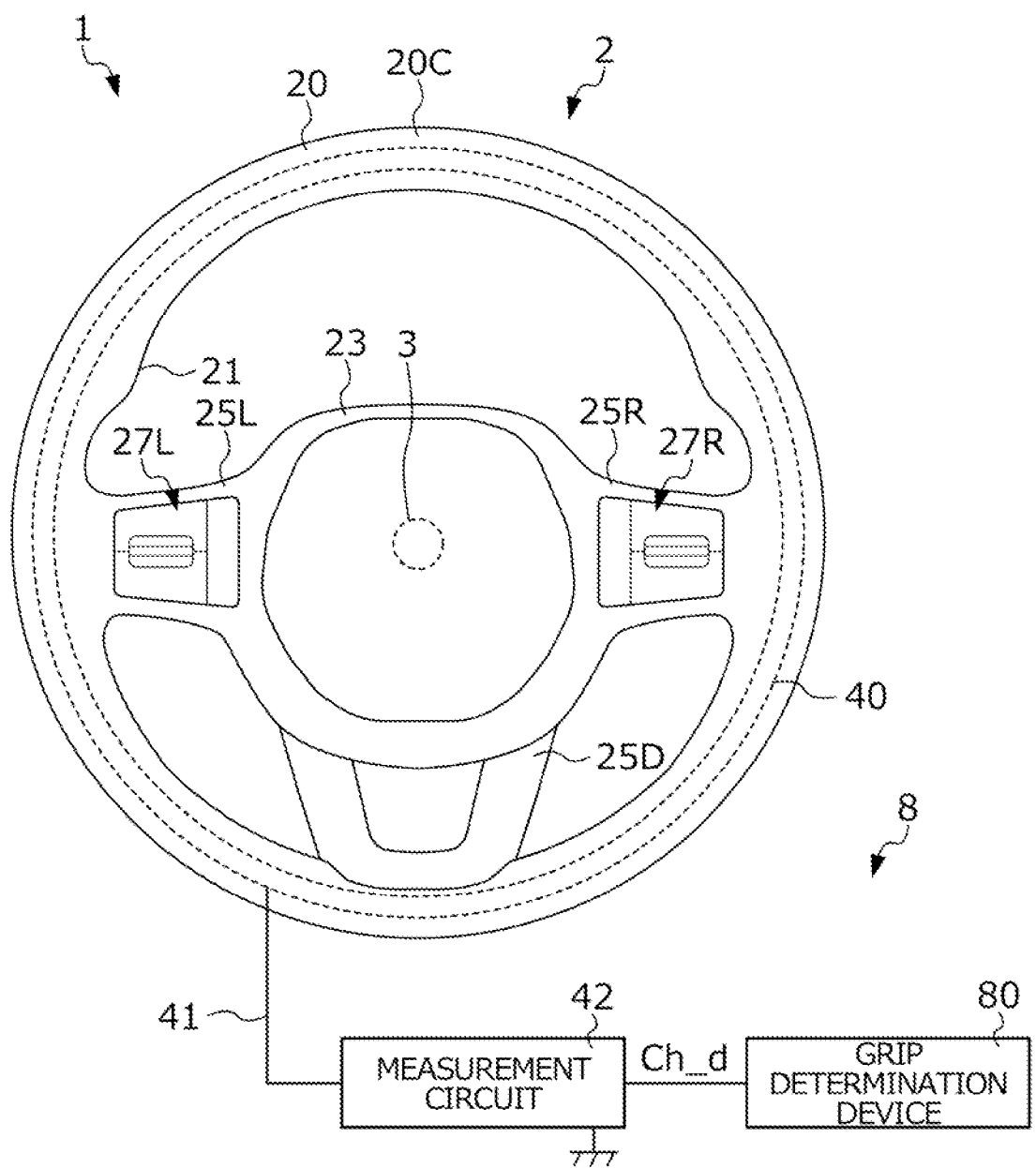
FIG. 1 is a view showing the configuration of a steering device according to a first embodiment of the present invention.

FIG. 1 is a view showing the configuration of a steering device 1 according to the present embodiment. The steering device 1 is equipped to a vehicle (not shown). The steering device 1 includes: a steering wheel 2 which accepts steering operation of the vehicle by the driver and auxiliary device operation related to a vehicle auxiliary device; a steering shaft 3 that pivotally supports this steering wheel 2; and a grip sensor unit 8 which determines the presence/absence of gripping of the steering wheel 2 by the driver, based on the measurement results for electrostatic capacitance of one or a plurality of electrodes provided to the steering wheel 2.

The steering wheel 2 includes a rim part 20 which can be gripped by the driver and is annular; a hub part 23 provided on the inner side of this rim part 20; and three spokes 25L, 25R, 25D connected to a rim inner circumferential part 21 of the rim part 20 extending along the radial direction from the hub part 23.

The hub part 23 is cylindrical, is provided at the center of the rim part 20 viewed from the driver, for example, and configures a center of the steering wheel 2. At a back side of the hub part 23 viewed from the driver, a steering shaft 3 which pivotally supports the steering wheel 2 is coupled. The steering shaft 3 is a rod-like coupling member which couples a core, which is the backbone of the hub part 23, and a steering mechanism which constitutes part of the vehicle frame which is not shown. Therefore, the steering torque generated by the driver rotating the steering wheel 2 is transferred to the steering mechanism, which is not shown, by this steering shaft 3.

The rim part 20 and hub part 23 are connected by the three spokes 25L, 25R, 25D. The left spoke part 25L extends along the horizontal direction, and connects a portion on the left side of the hub part 23 viewed from the driver, and a portion on the right side of the rim inner circumferential part 21 viewed from the driver. The right sport part 25R extends in parallel with the left spoke part 25L along the horizontal direction, and connects a portion on the right side of the hub part 23 viewed from the driver, and a portion on the right side of the rim inner circumferential direction 21 viewed from the driver. The lower spoke part 25D extends perpendicular to the spokes 25L, 25R along the vertical direction, and connects a portion on the lower part of the hub part 23 viewed from the driver, and a portion on a lower part of the rim inner circumferential part 21 viewed from the driver.

In the above way, the rim part 20 is annular viewed from the driver, and the driver can grip over the entire circumference thereof. In addition, one or a plurality of electrodes 40 of the grip sensor unit 8 described later are provided to this rim part 20. It should be noted that, in the present embodiment, a case of providing an electrode 40 to a rim part 20 of the steering wheel 2 will be explained; however, the present invention is not limited thereto. The electrode may be provided to a hub part 23 and/or spokes 25L, 25R, 25D, etc. in addition to the rim part 20. In addition, in the present embodiment, a case of setting the number of electrodes 40 provided to the steering wheel 2 to one will be explained; however, the present invention is not limited thereto. The number of electrodes provided to the steering wheel 2 may be two or more.

At the left spoke part 25L and right spoke part 25R, a left auxiliary device operation control unit 27L and a right auxiliary device operation control unit 27R which accept auxiliary device operations from the driver in order for the driver to operate vehicle auxiliary devices, which are not shown (for example, audio deice, car navigation device, etc.), are provided. The driver becomes able to operate the vehicle auxiliary devices by operating a plurality of switches provided to these auxiliary device operation control units 27L, 27R by finger.

It should be noted that, hereinafter, the positions of the substantially circular rim part 20, rim inner circumferential part 21, hub part 23 and steering shaft 3, and orientations of each spoke part 25L, 25R, 25D viewed from the driver may be represented by a clock-wise angle "°" centering around the steering shaft 3, and with the upper end part 20C of the rim part 20 viewed from the driver as a reference. In other words, the right spoke part 25R extends along the orientation of 90°, and connects a 90° portion of the hub part 23 and rim inner circumferential part 21. The lower spoke part 25D extends along an orientation of 180°, and connects a 180° portion of the hub part 23 and rim inner circumferential part 21. In addition, the left spoke part 25L extends along the orientation of 270°, and connects a 270° portion of the hub part 23 and rim inner circumferential part 21.

The grip sensor unit 8 includes: an electrode 40 provided to the rim part 20, a measurement circuit 42 electrically connected to this electrode 40, and a grip determination device 80 which determines the presence/absence of gripping of the steering wheel 2 by the driver based on the measurement result from the measurement circuit 42.

The electrode 40 is a circular arc shape extending along the rim part 20, and is electrically conductive. The electrode 40 is provided inside of the rim part 20. The measurement circuit 42 measures electrostatic capacitance between the electrode 40 and ground, as a value which fluctuates according to the distance between the arrangement position of the electrode 40 and the human body. As the distance between the arrangement position of the electrode 40 and human body narrows, the electrostatic capacitance between the electrode 40 and ground becomes larger. A measurement value Ch_d of electrostatic capacitance of the electrode 40 by the measurement circuit 42 is sent to the grip determination device 80.

Figure 2:
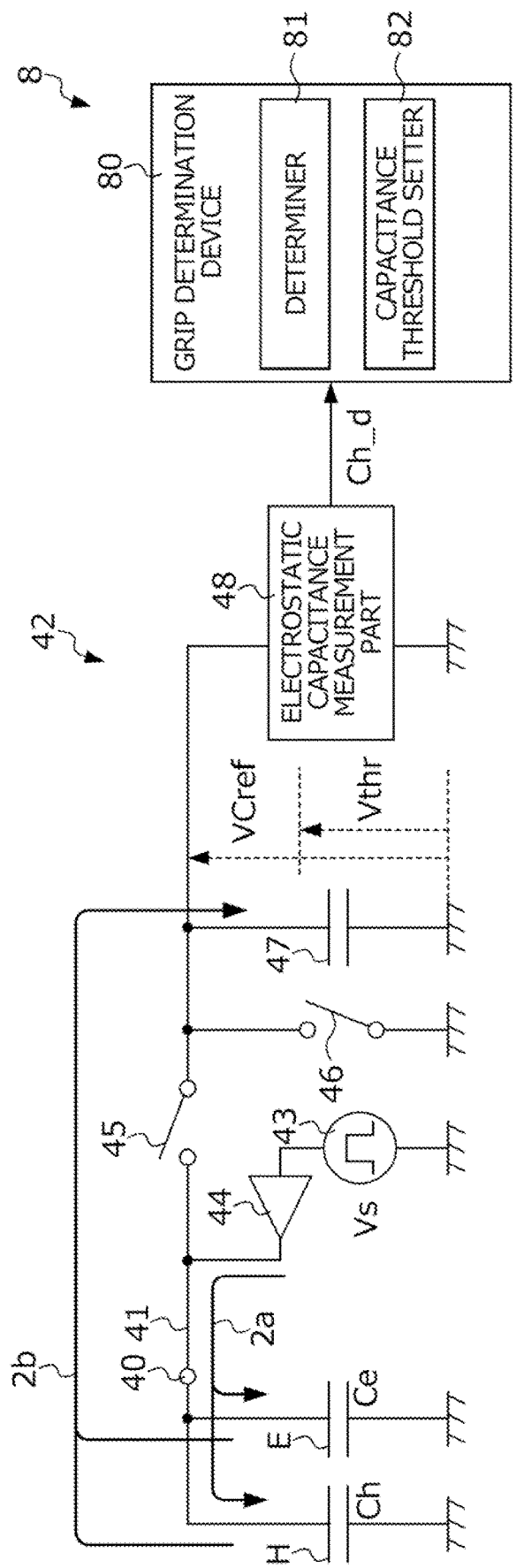
FIG. 2 is a view showing a circuit configuration of a measurement circuit.

FIG. 2 is a view showing the circuit configuration of the measurement circuit 42. The measurement circuit 42 includes a pulse power source 43, amplifier 44, first switch 45, second switch 46, charge capacitor 47, and electrostatic capacitance measurement unit 48. It should be noted that FIG. 2 illustrates the electrostatic capacitance between the electrode 40 and ground (for example, vehicle frame) to be divided into electrostatic capacitance Ch formed by the human body H including the hands of the driver operating the steering wheel 2, and the stray capacitance Ce formed by a floating capacitor E of wires, components, etc. excluding the human body H.

As shown in FIG. 2, the pulse power source 43 and amplifier 44 are connected in series. The second switch 46 and charge capacitor 47 are connected in parallel. A series circuit made from the pulse power source 43 and amplifier 44, and the parallel circuit made from the second switch 46 and charging capacitor 47 are connected via the first switch 45. An output terminal of the amplifier 44 and the first switch 45 are connected to the electrode 40 via the wire 41. Therefore, the pulse power source 43 is connected to the electrode 40 via the amplifier 44 and wire 41. In addition, the second switch 46 and charge capacitor 47 are connected to the electrode 40 respectively via the first switch 45 and wire 41.

The pulse power source 43 supplies a pulse voltage Vs of predetermined frequency and predetermined voltage to the amplifier 44, in response to a command from the grip determination device 80. The amplifier 44 amplifies the pulse voltage Vs supplied from the pulse power source 43, and applies it to the electrode 40.

The second switch 46 is a switching element which is turned ON/OFF by a drive circuit which is not illustrated. The drive circuit of this second switch 46 turns OFF the second switch 46 until the voltage VCref of the charge capacitor 47 reaches the threshold Vthr decided in advance, and turns ON the second switch 46 after the voltage VCref reaches the threshold Vthr, and discharges the charge stored in the charge capacitor 47.

The first switch 45 is a switching element which is turned ON/OFF by a drive circuit which is not illustrated. The drive circuit of this first switch 45 turns OFF the first switch 45 in response to rising of the pulse voltage Vs of the pulse power source 43. The pulse voltage supplied from the pulse power source 43 and amplifier 44 is applied to the electrode 40, the charge migrates through the path shown by the arrow 2a in FIG. 2, and the human body H and floating capacitor E are thereby charged.

In addition, the drive circuit of the first switch 45 turns ON the first switch 45 in response to rising of the pulse voltage Vs of the pulse power source 43. The human body H and floating capacitor E and the charge capacitor 47 are thereby connected, charge migrates through the path shown by the arrow 2b in FIG. 2 from the human body H and floating capacitor E to the charge capacitor 47, and the charge capacitor 47 is charged. The voltage VCref of the charge capacitor 47 thereby rises.

For this reason, when applying the pulse voltage to the electrode 40 by the pulse power source 43 and amplifier 44, charge and discharge of the human body H and floating capacitor E is alternately repeated, and the voltage VCref of the charge capacitor 47 gradually increases. At this time, the time until the voltage VCref of the charge capacitor 47 reaches the threshold Vthr (or pulse number of the pulse power source 43) varies according to the static capacitance Ch formed by the human body H, i.e. distance between the electrode 40 and body of the driver. In other words, in the case of part of the body of the driver contacting or approaching the arrangement position of the electrode 40 on the rim part 20, and the static capacitance Ch rising, the time taken until the voltage VCref of the charge capacitor 47 reaches the threshold Vthr shortens, and in the case of part of the body of the driver distancing from the arrangement position of the electrode 40 and the static capacitance Ch lowering, the time taken until the voltage VCref of the charge capacitor 47 reaches the threshold Vthr lengthens.

The static capacitance measurement unit 48 measures the time and pulse number until the voltage VCref of the charge capacitor 47 reaches the threshold Vthr, and measures the static capacitance Ch formed by the human body H existing in the vicinity of the electrode 40 indirectly based on this measurement result. The static capacitance measurement unit 48 sends a measurement value Ch_d of the static capacitance Ch obtained by the above sequence to the grip determination device 80.

The grip determination device 80 includes: a determiner 81 which determines the presence/absence of gripping of the steering wheel 2 based on the difference or comparison between the measurement value Ch_d and the capacitance threshold relative to the electrostatic capacitance such as the reference value Ch_0 or grip determination threshold Ch_th; and a capacitance threshold setter 82 which sequentially sets the capacitance threshold referenced upon determining the presence/absence of gripping in the determiner 81 based on the measurement value Ch_d.

The determiner 81 calculates the capacitance differential value ΔCh by subtracting the reference value Ch_0 from the measurement value Ch_d, and compares the magnitude of this capacitance differential value ΔCh and grip determination threshold Ch_th, thereby determining the presence/absence of gripping of the steering wheel 2 by the driver. More specifically, the determiner 81, in the case of the difference between the capacitance differential value ΔCh and grip determination threshold Ch_th (ΔCh−Ch_th) being 0 or positive, i.e. case of the following Formula (1-1) holding true, determines that the steering wheel 2 is gripped by the driver on the rim part 20. In addition, the determiner 81, in the case of the difference between the capacitance differential value ΔCh and grip determination threshold Ch_th (ΔCh−Ch_th) being negative, i.e. case of the following Formula (1-2) holding true, determines that the steering wheel 2 is not being gripped by the driver on the rim part 20.

$$Ch\_d - Ch\_0 \geq Ch\_th \quad (1\text{-}1)$$

$$Ch\_d - Ch\_0 < Ch\_th \quad (1\text{-}2)$$

Herein, the reference value Ch_0 corresponds to the value for the electrostatic capacitance of the electrode 40 when the hand of the driver is present at a position sufficiently distanced from the installation position of the electrode 40 on the steering wheel 2, and is a positive value. Therefore, the capacitance differential value ΔCh(=Ch_d−Ch_0) increases as the hand of the driver approaches the installation position of the electrode 40. As this reference value Ch_0, a fixed value set in advance or a value sequentially set by the capacitance threshold setter 82 can be used.

In addition, the grip determination threshold Ch_th is a threshold set relative to the capacitance differential value for determining whether the hand of the driver is sufficiently close to the installation position of the electrode 40, i.e. whether the driver is gripping the steering wheel 2, and is a positive value. As this grip determination threshold Ch_th, a fixed value set in advance or a value sequentially set by the capacitance threshold setter 82 can be used.

Herein, the measurement value Ch_d or capacitance differential value ΔCh fluctuates according to the environmental state such as the temperature and humidity around the installation position of the electrode 40, and not only the distance between the driver's hand and the installation position of the electrode 40. More specifically, the measurement value Ch_d or capacitance differential value ΔCh has a tendency of increasing as the temperature rises, and increasing as the humidity rises. For this reason, when setting the capacitance threshold such as the reference value Ch_0 or grip determination threshold Ch_th as a fixed value independent of the change in environmental state, there is concern over the determiner 81 misjudging. Therefore, the capacitance threshold setter 82 changes both or either of the reference value Ch_0 and grip determination threshold Ch_th according to the fluctuation in environmental state. It should be noted that, although the present embodiment explains a case of the capacitance threshold setter 82 varying the reference value Ch_0 according to the variation in environmental state, and setting the grip determination threshold Ch_th as a fixed value, the present invention is not limited thereto.

Figure 3:
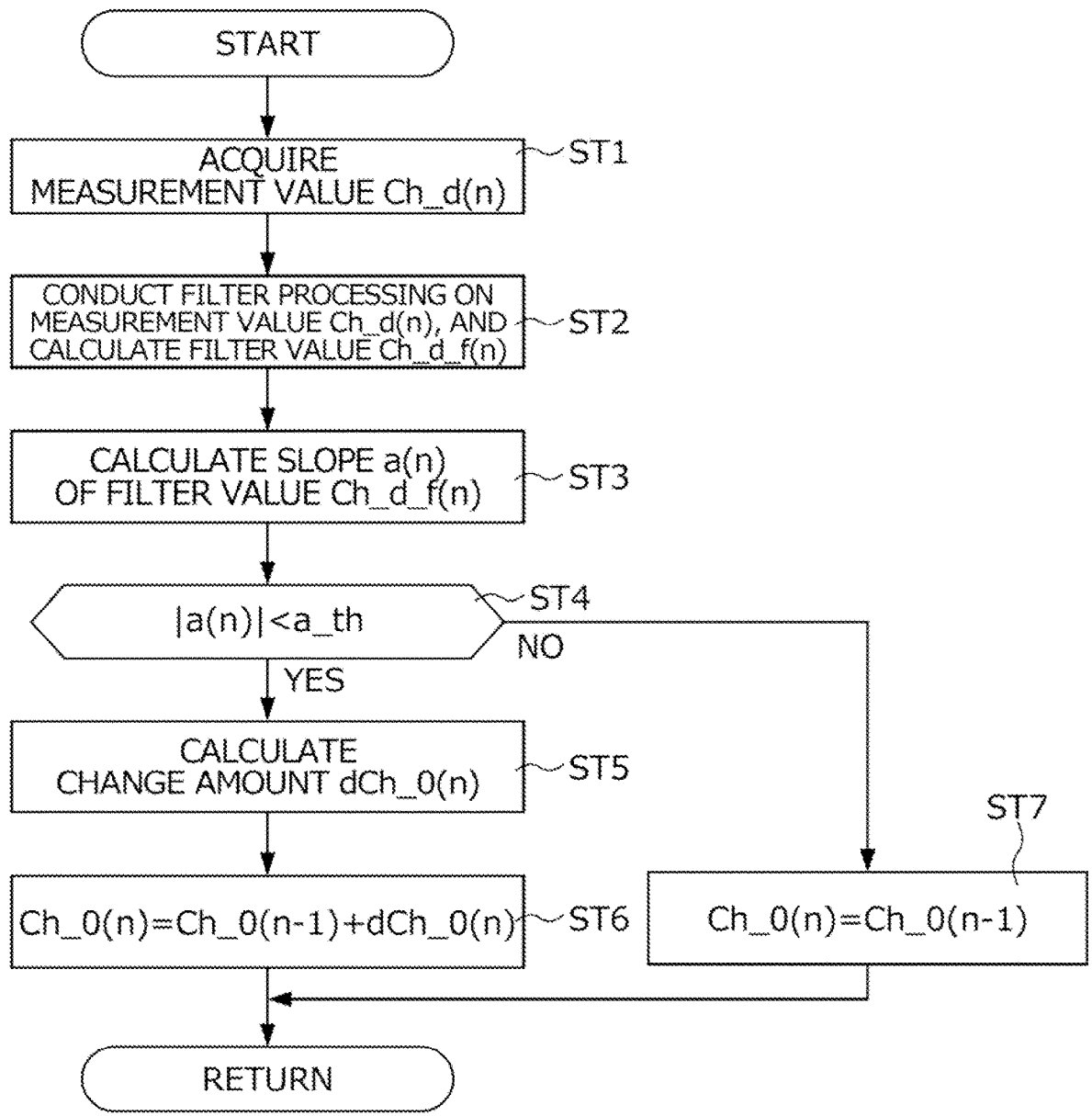
FIG. 3 is a flowchart showing a specific sequence of reference value setting processing of setting a reference value.

FIG. 3 is a flowchart showing a specific sequence of reference value setting processing of setting the reference value Ch_0. The reference value setting processing shown in FIG. 3 is repeatedly executed every predetermined control cycle Δt in the capacitance threshold setter 82.

First, in Step ST1, the capacitance threshold setter 82 acquires the measurement value Ch_d(n) for the electrostatic capacitance from the measurement circuit 42, and then advances to Step ST2. Herein, the symbol (n) is a symbol indicating the discretized time, and indicates being data acquire or calculated by processing in the $n^{th}$ control cycle. In other words, in the case of the symbol (n) being data acquired or calculated in a current control timing, the symbol (n−1) indicates data acquired or calculated in the previous control timing (i.e. before Δt). It should be noted that, in the following explanation, the symbol (n) indicating time is omitted as appropriate.

In Step ST2, the capacitance threshold setter 82 conducts filter processing for removing high-frequency noise in the measurement value Ch_d(n) acquired in Step ST1, and then advances to Step ST3. It should be noted that, hereinafter, the value obtained by conducting the filter processing on the measurement value Ch_d(n) is referred to as filter value, and is noted as "Ch_d_f(n)". In addition, the present embodiment explains a case of the capacitance threshold setter 82 conducting weighted moving average processing such as that shown in the following Formula (2), for example, as the filter processing on the measurement value Ch_d(n); however, the present invention is not limited thereto. Herein, in the following Formula, "w" is the weight, and is any positive value larger than 0.

$$Ch\_d\_f(n) = (Ch\_d(n) + w \times Ch\_d\_f(n-1))/(1+w) \quad (2)$$

In Step ST3, the capacitance threshold setter 82 calculates the slope a(n) of the filter value Ch_d_f(n) of the measurement value, and then advances to Step ST4. More specifically, the capacitance threshold setter 82 calculates the slope a(n) of the filter value Ch_d_f(n) in accordance with the following Formula (3).

$$a(n) = (Ch\_d\_f(n) - Ch\_d\_f(n-1))/\Delta t \quad (3)$$

In Step ST4, the capacitance threshold setter 82 determines whether the absolute value for the slope |a(n)| calculated in Step ST3 is less than a slope threshold a_th decided in advance. Herein, the slope threshold a_th is a threshold decided to distinguish if the change in measurement value and filter value thereof is caused by a change in the distance between the driver's hand and installation position of the electrode 40, or caused by a change in the environmental state around the electrode 40, and is a positive value.

The capacitance threshold setter 82 determines that the change in filter value in the determination period from n−1$^{th}$ period to n$^{th}$ period is caused by a change in the environmental state of the surroundings, in the case of the determination result in Step ST4 being YES, i.e. the absolute value of the slope |a(n)| being less than the slope threshold a_th, and then advances to Step ST5. In Step ST5, the capacitance threshold setter 82 calculates the change amount dCh_0(n) of the filter value by the following Formula (4), and then advances to Step ST6. Herein, change amount dCh_0(n) is the change amount of the filter value Ch_d_f(n) in the determination period from the n−1$^{th}$ period when the absolute value of slope |a(n)| of the filter value was less than the slope threshold a_th to n$^{th}$ period, as shown in the following Formula (4).

$$dCh\_0(n)=Ch\_d\_f(n)-Ch\_d\_f(n-1) \quad (4)$$

In Step ST6, the capacitance threshold setter 82 sets the value arrived at by adding the change amount dCh_0(n) calculated in Step ST5 to the reference value Ch_0(n−1) of the previous period as the reference value Ch_0(n), as shown in the following Formula (5), and then returns to Step ST1. In other words, the capacitance threshold setter 82 changes the reference value Ch_0(n) according to the change amount dCh_0(n) of the filter value when the absolute value of slope |a(n)| of the filter value was less than the slope threshold a_th. Therefore, the capacitance threshold setter 82 increases the reference value Ch_0(n) in the case of the change amount dCh_0(n) increasing (i.e. case of the change amount dCh_0(n) being a positive value), and decreases the reference value Ch_0(n) in the case of the change amount dCh_0(n) decreasing (i.e. case of the change amount dCh_0 (n) being a negative value). It should be noted that the initial value Ch_0(0) for the reference value is set to a value equal to the measurement value Ch_d(0) when it's a value decided in advance or immediately after the start of reference value setting processing shown in FIG. 3, and the steering wheel 2 is being gripped by the driver.

$$Ch\_0(n)=Ch\_0(n-1)+dCh\_0(n) \quad (5)$$

In addition, the capacitance threshold setter 82 determines that the change in filter value in the determination period from the n−1$^{th}$ period until the n$^{th}$ period is caused by the change in distance between the driver's hand and installation position of the electrode 40, in a case of the determination result in Step ST4 being NO, i.e. case of the absolute value of the slope |a(n)| being at least the slope threshold a_th, and then advances to Step ST7. In Step ST7, the capacitance threshold setter 82 sets the reference value Ch_0(n) to a value equal to the reference value Ch_0(n−1) in the previous period, as shown in the following Formula (6), and then returns to Step ST1. In other words, the capacitance threshold setter 82 maintains the reference value Ch_0(n) constant.

$$Ch\_0(n)=Ch\_0(n-1) \quad (6)$$

Figure 4:
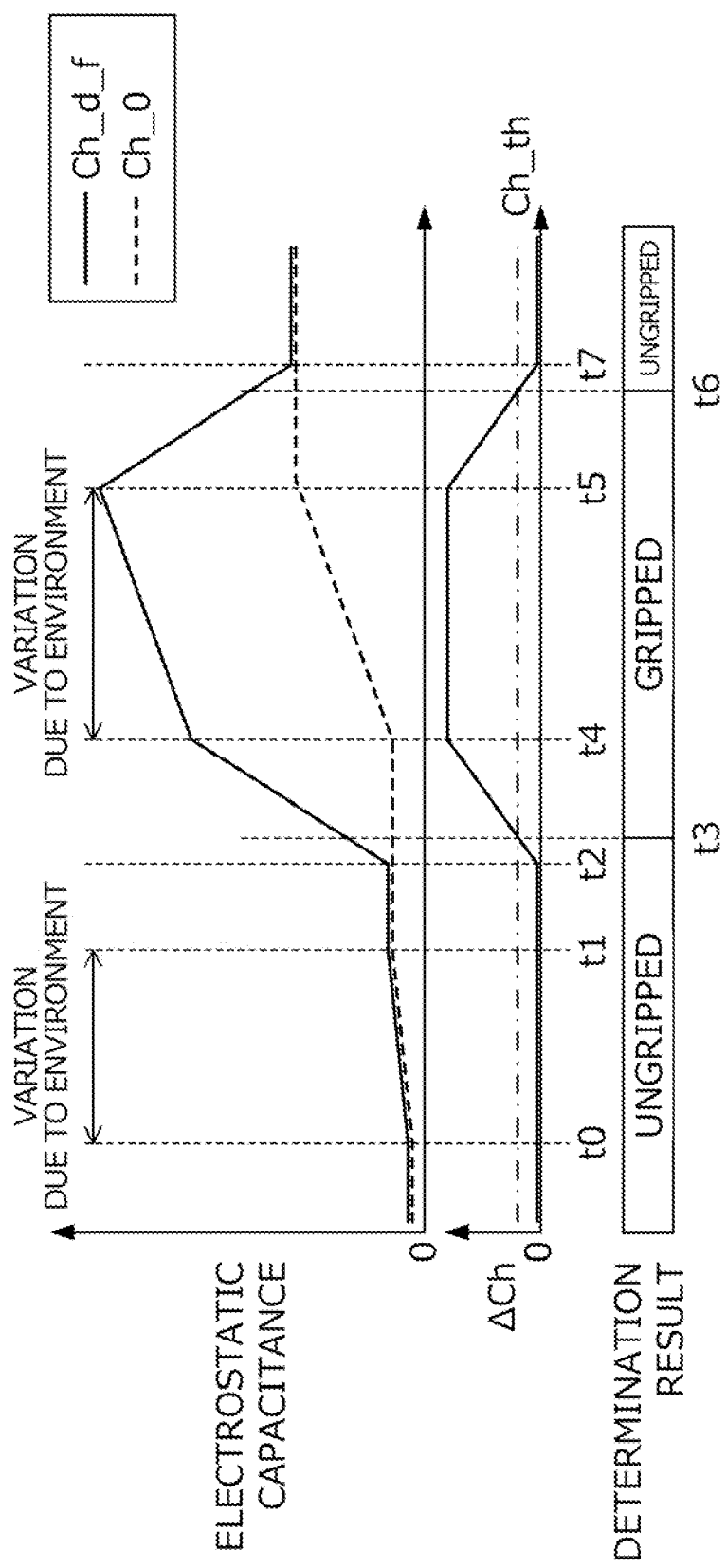
FIG. 4 is a time chart of a determination result related to the presence/absence of gripping of a steering wheel in a case of setting a reference value by the reference value setting processing shown in FIG. 3.

FIG. 4 is a time chart of the determination result relative to the presence/absence of gripping of the steering wheel 2, etc. in a case of setting the reference value Ch_0 by the above such reference value setting processing. The upper part of FIG. 4 shows the filter value Ch_d_f and reference value Ch_0, the middle part shows the capacitance differential value ΔCh, and the lower part shows the determination result.

First, by the environmental state around the electrode 40 in a state in which the steering wheel 2 is not being gripped changing between times t0 to t1, the filter value Ch_d_f slowly rises at a slope less than the slope threshold a_th. In this case, the capacitance threshold setter 82 raises the reference value Ch_0 following the rise of the filter value Ch_d_f (refer to Step ST6 in FIG. 3). For this reason, between times t0 to t2, the capacitance threshold setter 82 sets the reference value Ch_0 to a value substantially equal to the filter value Ch_d_f. Therefore, the capacitance differential value ΔCh becomes almost 0.

Next, between times t2 to t4, by the driver gripping the steering wheel 2, the filter value Ch_d_f rapidly rises. In addition, the slope of the filter value Ch_d_f occurring by the driver gripping the steering wheel 2 is at least the slope threshold a_th in this way. For this reason, the capacitance threshold setter 82 maintains the reference value Ch_0 constant (refer to Step ST7 in FIG. 3). For this reason, between times t2 and t4, the capacitance differential value ΔCh rises, and at time t3, exceeds the grip determination threshold Ch_th. For this reason, at time t3 and later, the determiner 81 determines that the steering wheel 2 is being gripped.

Next, by the environmental state around the electrode 40 changing in a state in which the steering wheel 2 is being gripped between times t4 and t5, the filter value Ch_d_f rapidly rises at a slope less than the slope threshold a_th. In this case, the capacitance threshold setter 82 raises the reference value Ch_0 following the rise of the filter value Ch_d_f (refer to Step ST6 in FIG. 3). For this reason, between times t4 and t5, the capacitance threshold setter 82 raises the reference value Ch_0 by the rise amount of the filter value Ch_d_f (refer to Step ST6 in FIG. 3). For this reason, between times t4 and t5, the capacitance differential value ΔCh becomes almost constant.

Next, between times t5 and t7, by the driver distancing the hand from the steering wheel 2, the filter value Ch_d_f rapidly declines. In addition, the absolute value for the slope of the filter value Ch_d_f occurring by the driver distancing the hand from the steering wheel 2 in this way is at least the slope threshold a_th. For this reason, the capacitance threshold setter 82 maintains the reference value Ch_0 constant (refer to Step ST7 in FIG. 3). For this reason, between times t5 to t7, the capacitance differential value declines, and at time t6, falls below the grip determination threshold Ch_th. For this reason, at time t6 and later, the determiner 81 determines that the steering wheel 2 is not being gripped.

In the above way, the capacitance threshold setter 82 can change the reference value according to variation in the environmental state around the electrode 40, by changing the reference value according to the change amount of the filter value when the absolute value for the slope of the filter value of the measurement value was less than the slope threshold.

In the above way, the present embodiment changes the reference value Ch_0(n) according to the change amount dCh_0(n) of the filter value Ch_d_f(n) in the determination period from the n−1th period to the nth period, i.e. during the control cycle Δt; however, the length of the determination period is not limited thereto. The determination period may be several cycles Δt×m (m is an integer of at least 2). In addition, the reference value setting processing shown in FIG. 3 changes the reference value Ch_0(n) according to the change amount dCh_0(n) of the filter value Ch_d_f(n) in a predetermined determination period; however, the present invention is not limited thereto. The capacitance threshold setter 82 may change the reference value Ch_0(n) according to the change amount in the predetermined determination period of the measurement value Ch_d(n) prior to conducting the filter processing.

In addition, the present embodiment explains a case of the determiner 81 determining the presence/absence of gripping of the steering wheel 2 by the driver based on the above Formulas (1-1) and (1-2); however, the present invention is not limited thereto. The determiner 81 may determine the presence/absence of gripping of the steering wheel 2 by the driver based on the following Formulas (7-1) and (7-2) equivalent to the above Formulas (1-1) and (1-2). In other words, the determiner 81 may determine that the steering wheel 2 is being gripped by the driver on the rim part 20, in the case of the sum of the grip determination threshold Ch_th and reference value Ch_0 being no more than the measurement value Ch_d, i.e. the following Formula (7-1) holding true, and may determine that the steering wheel 2 is not being gripped by the driver at the rim part 20, in the case of the sum of the grip determination threshold Ch_th and reference value Ch_0 being greater than the measurement value Ch_d, i.e. the following Formula (7-2) holding true.

$$Ch\_d \geq Ch\_th + Ch\_0 \quad (7\text{-}1)$$

$$Ch\_d < Ch\_th + Ch\_0 \quad (7\text{-}2)$$

According to the steering device 1 related to the present embodiment, the following effects are exerted.

(1) The grip determination device 80 of the steering device 1 includes the capacitance threshold setter 82 which sets the reference value Ch_0 for the electrostatic capacitance of the electrode 40 provided to the steering wheel 2; and the determiner 81 which determines the presence/absence of gripping of the steering wheel 2 based on a comparison between the grip determination threshold Ch_th and the capacitance differential value ΔCh between the reference value Ch_0 and measurement value Ch_d of the electrode 40 by the measurement circuit 42. Herein, when the driver grips the steering wheel 2, the measurement value Ch_d of electrostatic capacitance by the measurement circuit 42 increases, and the difference between the measurement value Ch_d and reference value Ch_0 also increases. For this reason, the steering deice 1 can determine the presence/absence of gripping of the steering wheel 2 based on the difference between the measurement value Ch_d and reference value Ch_0. In addition, the measurement value Ch_d of the electrostatic capacitance by the measurement circuit 42 also varies when the environmental state such as the temperature and humidity around the steering wheel 2 varies; however, the change rate thereof is slower than the change rate of the measurement value Ch_d when the driver brings their hand towards and away from the steering wheel 2. Therefore, the capacitance threshold setter 82 causes the reference value Ch_0 to vary according to the change amount of the filter value Ch_d_f when the absolute value of the slope of the filter value Ch_d_f of the measurement value is less than the slope threshold a_th, i.e. when the change rate of the filter value Ch_d_f is gentle. Since it is thereby possible to eliminate the change amount of the filter value Ch_d_f caused by the change in environmental state around the steering wheel 2 from the difference between the filter value Ch_d_f and reference value Ch_0, it is possible to prevent misjudgment due to fluctuation in the environmental state around the steering wheel 2, and thus can contribute to the development of a sustainable transportation system. In addition, with the steering device 1, since there is no need to provide a sensor for detecting the environmental state around the steering wheel 2, it is possible to prevent misjudgment with a simpler configuration than conventional.

(2) The capacitance threshold setter 82, in the case of the absolute value |a| for the slope of the filter value Ch_d_f in a predetermined determination period being less than the slope threshold a_th and the filter value Ch_d_f increasing in this determination period, increases he reference value Ch_0, and in the case of the absolute value |a| for the slope of the filter value Ch_d_f in a predetermined determination period being less than the slope threshold a_th and the filter value Ch_d_f increasing in this determination period, decreases the reference value Ch_0. It is thereby possible to appropriately vary the reference value Ch_0 so that the difference between the measurement value Ch_d and reference value Ch_0 becomes constant irrespective of a change in the environmental state around the steering wheel 2. In addition, in the case of the absolute value |a| for the slope of the filter value Ch_d_f in the determination period being at least the slope threshold a_th, the capacitance threshold setter 82 determines that the change in this filter value Ch_d_f is due to the driver bringing the hand towards or distancing from the steering wheel 2, and maintains the reference value Ch_0 constant. Consequently, according to the steering device 1, it is possible to divide the change amount of filter value Ch_d_f in the electrostatic capacitance into being caused by a change in environmental state, and caused by the driver bringing the hand towards or distancing from the steering wheel 2.

(3) The determiner 81 determines the presence/absence of gripping of the steering wheel 2 based on the capacitance differential value ΔCh obtained by subtracting the reference value Ch_0 from the measurement value Ch_d. Consequently, according to the steering device 1, since it is possible to make the capacitance differential value ΔCh constant irrespective of the change in environmental state around the steering wheel 2, it is possible to determine the presence/absence of gripping precisely.

In the above way, the present embodiment explains a case of the capacitance threshold setter 82 making the grip determination threshold Ch_th constant and changing the reference value Ch_0 according to the variation in environmental state; however, the present invention is not limited thereto. The capacitance threshold setter 82 may make the reference value Ch_0 constant and change the grip determination threshold Ch_th according to a variation in environmental state. It should be noted that, in this case, the timing and width of changing the grip determination threshold Ch_th are the same as the timing and width of changing the reference value Ch_0 in the reference value setting processing shown in FIG. 3; therefore, a detailed explanation is omitted. In this case, since it is possible to make the difference between the capacitance differential value ΔCh and grip determination threshold Ch_th constant irrespective of a change in the environmental state around the steering wheel 2, it is possible to determine the presence/absence of gripping precisely, similarly to the above-mentioned embodiment.

Second Embodiment

Next, a steering device according to a second embodiment of the present invention will be explained while reference the drawings. It should be noted that, in the following explanation, configurations identical to the steering device according to the first embodiment are assigned the same reference symbol, and detailed explanations thereof are omitted.

Figure 5:
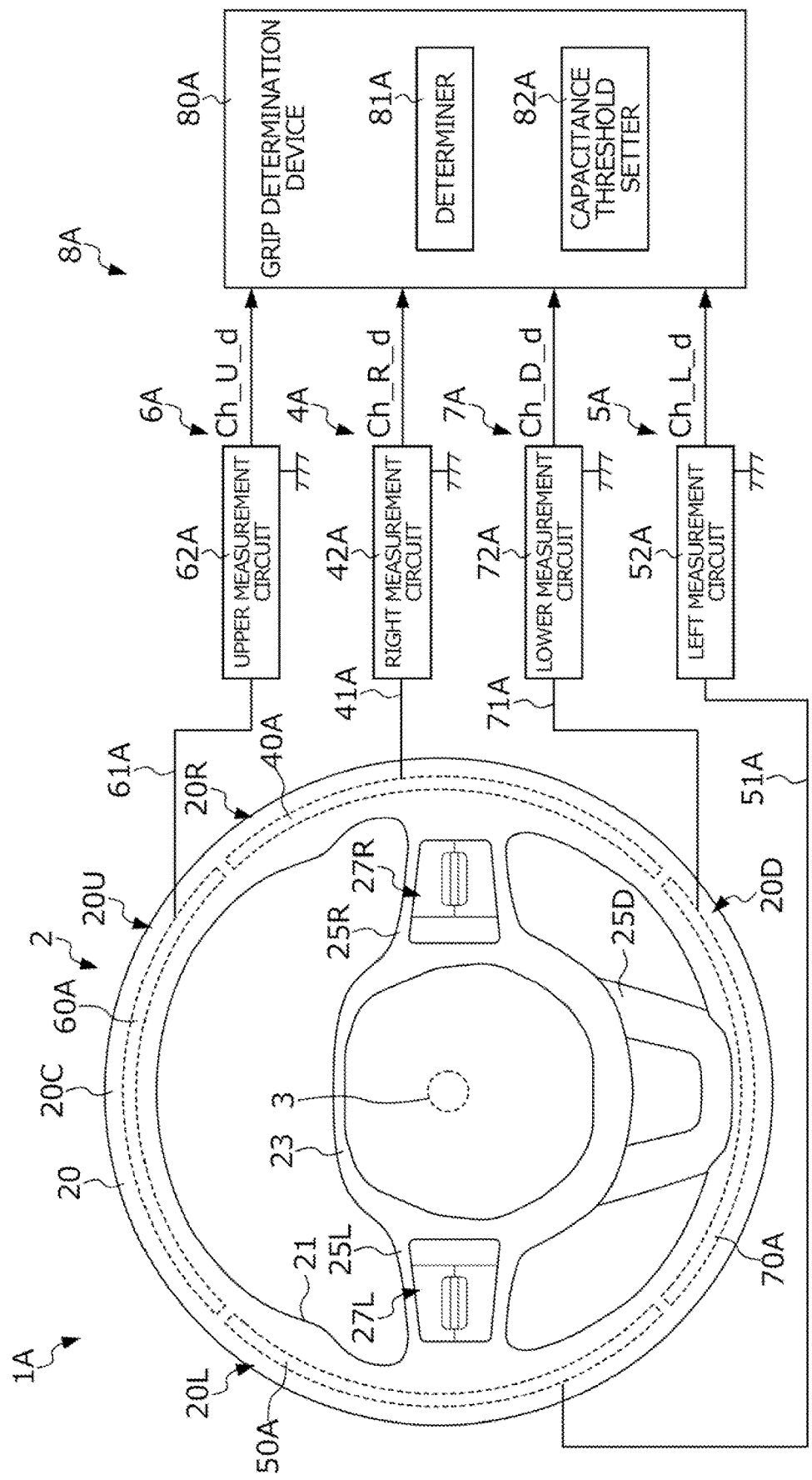
FIG. 5 is a view showing the configuration of a steering device according to a second embodiment of the present embodiment.

FIG. 5 is a view showing the configuration of a steering device 1A according to the present embodiment. The steering device 1A according to the present embodiment differs from the steering device 1 according to the first embodiment in the configuration of a grip sensor unit 8A.

The grip sensor unit 8A includes a plurality (four in the present embodiment) of proximity sensors 4A, 5A, 6A, 7A of respectively different detection target regions, and a grip determination device 80A which determines the presence/absence of gripping and gripping position of the steering wheel 2 by the driver based on the measurement results of these proximity sensors 4A to 7A.

The right proximity sensor 4A includes a right electrode 40A provided to the rim part 20, and a right measurement circuit 42 electrically connected with this right electrode 40A. The right electrode 40A is an arc shape extending along the rim part 20, and is electrically conductive. The right electrode 40A is provided at the inner part of the rim part 20. The right electrode 40A is arranged in a range of about 90° of the rim part 20 between 45° and 135° (i.e. range grippable by the driver with their right hand mainly while going straight). It should be noted that, hereinafter, the region of the rim part 20 in which the right electrode 40A is arranged is also referred to as the right grip part 20R. The right measurement circuit 42A is connected with the right electrode 40A via a wire 41A. The right measurement circuit 42A measures the electrostatic capacitance between the right electrode 40A and ground, as a value which varies in response to the distance between the arrangement position of the right electrode 40A and the human body. The electrostatic capacitance between the right electrode 40A and ground becomes larger as the distance between the arrangement position of the right electrode 40A and human body approaches. The measurement value $Ch\_R\_d$ of the electrostatic capacitance by the right measurement circuit 42A is sent to the grip determination device 80A. It should be noted that, since the circuit configuration of the right measurement circuit 42A is substantially the same as the circuit configuration of the measurement circuit 42 according to the first embodiment, a detailed explanation thereof is omitted.

The left proximity sensor 5A includes a left electrode 50 provided to the rim part 20, and a left measurement circuit 52 electrically connected with this left electrode 50. The left electrode 50A is a circular arc shape extending along the rim part 20, and is electrically conductive. The left electrode 50A is provided inside of the rim part 20. The left electrode 50A is arranged in the range of about 90° between 225° and 315° of the rim part 20 (i.e. range grippable mainly by the left hand of the driver while going straight). It should be noted that the region of the rim part 20 in which the left electrode 50A is arranged is also referred to as left grip part 20L below. The left measurement circuit 52A is connected with the left electrode 50A via the wire 51A. The left measurement circuit 52A measures the static capacitance between the left electrode 50A and ground, as a value which varies according to the distance between the arrangement position of the left electrode 50A and the human body. As the distance between the arrangement position of the left electrode 50A and the human body approaches, the electrostatic capacitance between the left electrode 50A and ground increases. The measurement value $Ch\_L\_d$ of the static capacitance by the left detection circuit 52A is sent to the grip determination device 80A. It should be noted that the circuit configuration of the left measurement circuit 52A is substantially the same as the circuit configuration of the right measurement circuit 42 according to the first embodiment, and thus detailed explanation thereof is omitted.

The upper proximity sensor 6A includes an upper electrode 60A provided to the rim part 20, and an upper measurement circuit 62A electrically connected with this upper electrode 60A. The upper electrode 60A is a circular arc shape extending along the rim part 20, and is electrically conductive. The upper electrode 60A is provided inside of the rim part 20. The upper electrode 60A is arranged in a range of about 90° between 315° and 405° (45°) of the rim part 20 (i.e. range grippable by the right hand or left hand of the driver while turning). It should be noted that the region of the rim part 20 in which the upper electrode 60A is arranged is also referred to as rim part upper part 20U hereinafter. The upper detection circuit 62A is connected with the upper electrode 60A via a wire 61A. The upper measurement circuit 62A measures the static capacitance between the upper electrode 60A and ground, as a value which varies according to the distance between the arrangement position of the upper electrode 60A and the human body. As the distance between the arrangement position of the upper electrode 60A and human body approaches, the static capacitance between the upper electrode 60A and ground increases. The measurement value $Ch\_U\_d$ of static capacitance from the upper detection circuit 62A is sent to the grip determination device 80A. It should be noted that the circuit configuration of the upper measurement circuit 62A is substantially the same as the circuit configuration of the right measurement circuit 42 according to the first embodiment, and thus a detailed explanation is omitted.

The lower proximity sensor 7A includes a lower electrode 70A provided to the rim part 20, and a lower measurement circuit 72A electrically connected with this lower electrode 70A. The lower electrode 70A is a circular arc shape extending along the rim part 20, and is electrically conductive. The lower electrode 70A is provided at the inner side of the rim part 20. The lower electrode 70A is arranged in a range of about 90° between 135° and 225° of the rim part 20 (i.e. grippable range by right hand or left hand of driver while going straight, and range of the rim part 20 closest to knees of driver). It should be noted that the region of the rim part 20 in which the lower electrode 70A is arranged is also referred to as lower grip part 20D hereinafter. The lower measurement circuit 72A is connected with the lower electrode 70A via a wire 71A. The lower measurement circuit 72A measures the static capacitance between the lower electrode 70A and ground as a value which varies according to the distance between the arrangement position of the lower electrode 70A and the human body. As the distance between the arrangement position of the lower electrode 70A and the human body approaches, the static capacitance between the lower electrode 70A and ground increases. The measurement value $Ch\_D\_d$ of static capacitance from the lower detection circuit 72A is sent to the grip determination device 80A. It should be noted that the circuit configuration of the lower measurement circuit 72A is substantially the same as the circuit configuration of the right measurement circuit 42 according to the first embodiment, and thus a detailed explanation is omitted.

In the above way, the right electrode 40A of the right proximity sensor 4A is provided at a position closer to the right grip part 20R than the other electrodes 50A, 60A, 70A. For this reason, the right proximity sensor 4A defines the right grip part 20R of the rim part 20 as a detection target region. The left electrode 50A of the left proximity sensor 5A is provided at a position closer to the left grip part 20L than the other electrodes 40A, 60A, 70A. For this reason, the left proximity sensor 5A defines the left grip part 20L of the rim part 20 as the detection target region. The upper electrode 60A of the upper proximity sensor 6A is provided at a position closer to the upper grip part 20U than the other electrodes 40A, 50A, 70A. For this reason, the upper proximity sensor 6A defines the upper grip part 20U of the rim part 20 as a detection target region. The lower electrode 70A of the lower proximity sensor 7A is provided at a position closer to the lower grip part 20D than the other electrodes 40A, 50A, 60A. For this reason, the lower proximity sensor 7A defines the lower grip part 20D of the rim part 20 as a detection target region. In the above way, the detection target region is decided for every proximity sensor 4A to 7A, in the rim part 20 of the steering wheel 2. The grip determination device 80A acquires the presence/absence of gripping of the rim part 20 by the driver and the gripping position, based on each of the measurement values Ch_R_d, Ch_L_d, Ch_U_d and Ch_D_d of the four proximity sensors 4A to 7A having different detection target regions on the rim part 20 as mentioned above.

The grip determination device 80A includes: the determiner 81A which determines the presence/absence of gripping by the driver in every detection target region, based on the difference or comparison between the measurement values Ch_R_d, Ch_L_d, Ch_U_d, Ch_D_d of each proximity sensor 4A to 7A and the capacitance threshold for electrostatic capacitance such as the reference value Ch_0 or the grip determination threshold Ch_th, and the capacitance threshold setter 82A which sequentially sets the capacitance threshold referenced upon determining the presence/absence of gripping in the determiner 81A, based on the measurement values Ch_R_d, Ch_L_d, Ch_U_d, Ch_D_d.

The determiner 81A calculates the capacitance differential value ΔCh_R by subtracting the reference value Ch_0 from the measurement value Ch_R_d of the right proximity sensor 4A, and compares the size of this capacitance differential value ΔCh_R with the grip determination threshold Ch_th, thereby determining the presence/absence of gripping of the right grip 20R with the right proximity sensor 4A of the steering wheel 2 as the detection target region. More specifically, the determiner 81A determines that the steering wheel 2 is being gripped by the driver on the right grip 20R of the rim part 20, in the case of the difference (ΔCh_R−Ch_th) between the capacitance differential value ΔCh_R and the grip determination threshold Ch_th being 0 or positive, i.e. the following Formula (8-1) holding true. In addition, the determiner 81A determines that the steering wheel 2 is not being gripped by the driver on the right grip 20R of the rim part 20 in the case of the difference (ΔCh_R−Ch_th) between the capacitance differential value ΔCh_R and the grip determination threshold Ch_th being negative, i.e. the following Formula (8-2) holding true.

$$Ch\_R\_d - Ch\_0 \geq Ch\_th \quad (8\text{-}1)$$

$$Ch\_R\_d - Ch\_0 < Ch\_th \quad (8\text{-}2)$$

The determiner 81A calculates the capacitance differential value ΔCh_L by subtracting the reference value Ch_0 from the measurement value Ch_L_d of the left proximity sensor 5A, and compares the size of this capacitance differential value ΔCh_L with the grip determination threshold Ch_th, thereby determining the presence/absence of gripping of the left grip 20L with the left proximity sensor 5A of the steering wheel 2 as the detection target region. More specifically, the determiner 81A determines that the steering wheel 2 is being gripped by the driver on the left grip 20L of the rim part 20, in the case of the difference (ΔCh_L−Ch_th) between the capacitance differential value ΔCh_L and the grip determination threshold Ch_th being 0 or positive, i.e. the following Formula (9-1) holding true. In addition, the determiner 81A determines that the steering wheel 2 is not being gripped by the driver on the left grip 20L of the rim part 20 in the case of the difference (ΔCh_L−Ch_th) between the capacitance differential value ΔCh_L and the grip determination threshold Ch_th being negative, i.e. the following Formula (9-2) holding true.

$$Ch\_L\_d - Ch\_0 \geq Ch\_th \quad (9\text{-}1)$$

$$Ch\_L\_d - Ch\_0 < Ch\_th \quad (9\text{-}2)$$

The determiner 81A calculates the capacitance differential value ΔCh_U by subtracting the reference value Ch_0 from the measurement value Ch_U_d of the upper proximity sensor 6A, and compares the size of this capacitance differential value ΔCh_U with the grip determination threshold Ch_th, thereby determining the presence/absence of gripping of the upper grip 20U with the upper proximity sensor 6A of the steering wheel 2 as the detection target region. More specifically, the determiner 81A determines that the steering wheel 2 is being gripped by the driver on the upper grip 20U of the rim part 20, in the case of the difference (ΔCh_U−Ch_th) between the capacitance differential value ΔCh_U and the grip determination threshold Ch_th being 0 or positive, i.e. the following Formula (10-1) holding true. In addition, the determiner 81A determines that the steering wheel 2 is not being gripped by the driver on the upper grip 20U of the rim part 20 in the case of the difference (ΔCh_U−Ch_th) between the capacitance differential value ΔCh_U and the grip determination threshold Ch_th being negative, i.e. the following Formula (10-2) holding true.

$$Ch\_U\_d - Ch\_0 \geq Ch\_th \quad (10\text{-}1)$$

$$Ch\_U\_d - Ch\_0 < Ch\_th \quad (10\text{-}2)$$

The determiner 81A calculates the capacitance differential value ΔCh_D by subtracting the reference value Ch_0 from the measurement value Ch_D_d of the lower proximity sensor 7A, and compares the size of this capacitance differential value ΔCh_D with the grip determination threshold Ch_th, thereby determining the presence/absence of gripping of the lower grip 20D with the upper proximity sensor 7A of the steering wheel 2 as the detection target region. More specifically, the determiner 81A determines that the steering wheel 2 is being gripped by the driver on the lower grip 20D of the rim part 20, in the case of the difference (ΔCh_D−Ch_th) between the capacitance differential value ΔCh_D and the grip determination threshold Ch_th being 0 or positive, i.e. the following Formula (11-1) holding true. In addition, the determiner 81A determines that the steering wheel 2 is not being gripped by the driver on the lower grip 20D of the rim part 20 in the case of the difference (ΔCh_D−Ch_th) between the capacitance differential value ΔCh_D and the grip determination threshold Ch_th being negative, i.e. the following Formula (11-2) holding true.

$$Ch\_D\_d - Ch\_0 \geq Ch\_th \quad (11\text{-}1)$$

$$Ch\_D\_d - Ch\_0 < Ch\_th \quad (11\text{-}2)$$

Herein, reference value Ch_0 corresponds to the value of the electrostatic capacitance of the electrodes 40A to 70A when the hand of the driver is present at a position sufficiently distanced from the installation position of the electrodes 40A to 70A of the steering wheel 2, and is a positive value. Therefore, each capacitance differential value ΔCh_R (=Ch_R_d−Ch_0), ΔCh_L (=Ch_L_d−Ch_0), ΔCh_U (=Ch_U_d−Ch_0), ΔCh_D (=Ch_D_d−Ch_0) increases as the hand of the driver approaches the installation position of each electrode 40A to 70A. A fixed value decided in advance or a value sequentially set by the capacitance threshold setter 82A can be used as this reference value Ch_0.

In addition, grip determination threshold Ch_th is a threshold set for each capacitance differential value ΔCh_R, ΔCh_L, ΔCh_U, ΔCh_D for determining whether the hand of the driver is sufficiently close to the installation position of each electrode 40A to 70A, i.e. whether the driver is gripping the steering wheel 2 at each grip part 20R, 20L, 20U, 20D, and is a positive value. A fixed value decided in advance or a value sequentially set by the capacitance threshold setter 82A can be used as this grip determination threshold Ch_th.

Herein, each measurement value Ch_R_d, Ch_L_d, Ch_U_d, Ch_D_d and the capacitance differential values ΔCh_R, ΔCh_L, ΔCh_U, ΔCh_D vary according to not only the distance between the hand of the driver and the installation position of each electrode 40A to 70A, but also the environmental state such as the temperature and humidity around the installation position of each electrode 40A to 70A. More specifically, each measurement value Ch_R_d, Ch_L_d, Ch_U_d, Ch_D_d and the capacitance differential values ΔCh_R, ΔCh_L, ΔCh_U, ΔCh_D has a tendency of increasing with a higher temperature, and increasing with a higher humidity. For this reason, there is concern over the determiner 81A misjudging when setting the capacitance threshold such as the reference value Ch_0 or grip determination threshold Ch_th as a fixed value which is independent of the change in environmental state. Therefore, the capacitance threshold setter 82A changes both or either of the reference value Ch_0 and grip determination threshold Ch_th according to the variation in environmental state. It should be noted that the present embodiment explains a case of the capacitance threshold setter 82A varying the reference value Ch_0 according to variations in the environmental state, and setting the grip determination threshold Ch_th to a fixed value; however, the present invention is not limited thereto.

Figure 6:
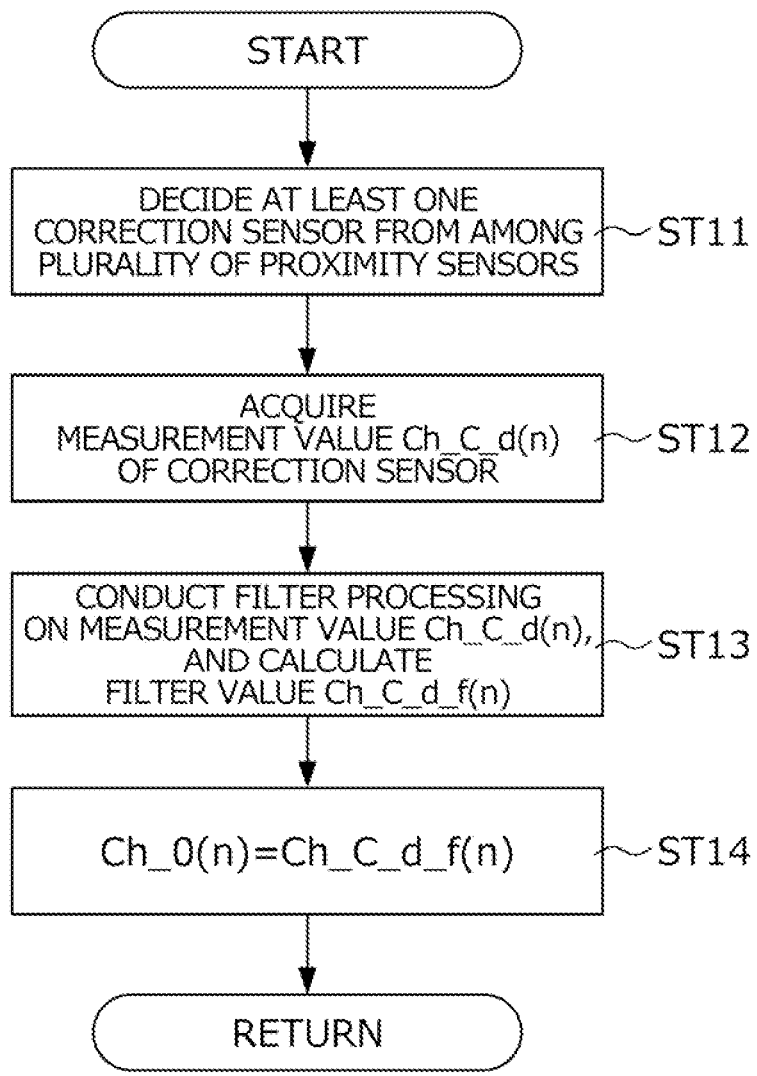
FIG. 6 is a flowchart showing a specific sequence of reference value setting processing of setting a reference value.

FIG. 6 is a flowchart showing a specific sequence of reference value setting processing of setting the reference value Ch_0. The reference value setting processing shown in FIG. 6 is repeatedly executed every predetermined control cycle Δt in the capacitance threshold setter 82A.

First, in Step ST11, the capacitance threshold setter 82A decides at least one among the plurality of proximity sensors 4A, 5A, 6A, 7A as a correction sensor, based on the determination result of the presence/absence of gripping of each grip part 20R, 20L, 20U, 20D by the determiner 81A, and then advances to Step ST12. More specifically, the capacitance threshold setter 82A decides, as the correction sensor, a sensor with a region among the four proximity sensors 4A, 5A, 6A, 7A determined as not being gripped by the determiner 81A, as the detection target region. It should be noted that, at this time, in the case of a plurality of regions determined as not being gripped by the determiner 81A being present, a sensor having the smallest measurement value among the plurality of proximity sensors with a region determined as not being gripped as the detection target region is set as the correction sensor.

In Step ST12, the capacitance threshold setter 82A acquires the measurement value of the correction sensor decided in Step ST11, and then advances to Step ST13. It should be noted that, in the following, the measurement value in the $n^{th}$ control cycle of the correction sensor is noted as "Ch_C_d(n)".

In Step ST13, the capacitance threshold setter 82A conducts filter processing for removing high-frequency noise by similar sequence to the first embodiment on the measurement value Ch_C_d(n) of the correction sensor acquired in Step ST12, and then advances to Step ST14. It should be noted that, hereinafter, the value obtained by conducting filter processing on the measurement value Ch_C_d(n) of the correction sensor is referred to as filter value, and noted as "Ch_C_d_f(n)".

In Step ST14, the capacitance threshold setter 82A sets the reference value Ch_0(n) to a value equal to the filter value Ch_C_d_f(n) of the measurement value of the correction sensor as shown in Formula (12) below, and then returns to Step ST11.

$$Ch\_0(n)=Ch\_C\_d\_f(n) \tag{12}$$

In the above way, by setting the sensor among the plurality of proximity sensors 4A, 5A, 6A, 7A setting the region determined as not being gripped by the determiner 81A as a detection target region as the correction sensor, and setting the reference value Ch_0 based on the measurement value of this correction sensor, the capacitance threshold setter 82A can vary the reference value Ch_0 according to variation in the environmental state around the electrodes 40A, 50A, 60A, 70A.

In the above way, in the present embodiment, the capacitance threshold setter 82A sets the reference value Ch_0(n) so as to be equal to the filter value Ch_C_d_f(n) of the measurement value Ch_C_d(n) of the correction sensor; however, the present invention is not limited thereto. The capacitance threshold setter 82A may set the reference value Ch_0(n) so as to be equal to the measurement value Ch_C_d(n) of the correction sensor prior to conducting the filter processing.

In addition, the present embodiment explains a case of the determiner 81A determining the presence/absence of gripping of the right grip part 20R of the steering wheel 2 by the driver based on the above Formulas (8-1) and (8-2); however, the present invention is not limited thereto. The determiner 81A may determine the presence/absence of gripping of the right grip part 20R of the steering wheel 2 by the driver, based on the following Formulas (13-1) and (13-2) equivalent to the above Formulas (8-1) and (8-2). In other words, the determiner 81A may determine that the steering wheel 2 is being gripped by the driver on the right grip part 20R, in the case of the sum of the grip determination threshold Ch_th and reference value Ch_0 being no more than the measurement value Ch_R_d, i.e. case of the following Formula (13-1) holding true, and may determine that the steering wheel 2 is not being gripped by the driver on the right grip part 20R, in the case of the sum of the grip determination threshold Ch_th and reference value Ch_0 being greater than the measurement value Ch_R_d, i.e. case of the following Formula (13-2) holding true. It should be noted that, since the determinations of the presence/absence of gripping of the left grip part 20L, upper grip part 20U and lower grip part 20D are similar, detailed explanations are omitted.

$$Ch\_R\_d \geq Ch\_th+Ch\_0 \tag{13-1}$$

$$Ch\_R\_d < Ch\_th+Ch\_0 \tag{13-2}$$

According to the steering device 1A related to the present embodiment, the following effects are exerted.

(4) The steering device 1A includes: the plurality of proximity sensors 4A, 5A, 6A, 7A having different detection target regions, and the grip determination device 80A which determines the presence/absences of gripping of each grip part 20R, 20L, 20U, 20D of the steering wheel 2 based on the measurement values Ch_R_d, Ch_L_d, Ch_U_d, Ch_D_d of the electrostatic capacitance of each electrode 40A, 50A, 60A, 70A by these proximity sensors 4A, 5A, 6A, 7A. The grip determination device 80A includes: the capacitance threshold setter 82A which sets the reference value Ch_0 for the electrostatic capacitance of the electrodes 40A, 50A, 60A, 70A; and the determiner 81A which determines the presence/absence of gripping for every grip part 20R, 20L, 20U, 20D based on the difference between each measurement value Ch_R_d, Ch_L_d, Ch_U_d, Ch_D_d and the reference value Ch_0. Herein, when the driver grips the steering wheel at any of the plurality of the grip parts 20R, 20L, 20U, 20D, the measurement value of the proximity sensor with this gripped region as the detection target region increases, and thus the difference between the measurement value and reference value Ch_0 also increases. For this reason, the steering device 1A can determine the presence/absence of gripping for every grip part 20R, 20L, 20U, 20D based on the difference between each measurement value Ch_R_d, Ch_L_d, Ch_U_d, Ch_D_d and the reference value Ch_0. Herein, when the environmental state around the steering wheel 2 changes, the measurement values Ch_R_d, Ch_L_d, Ch_U_d, Ch_D_d for electrostatic capacitance by these proximity sensors 4A, 5A, 6A, 7A also changes. At this time, since it is estimated that the hand of the driver is distanced from the grip part determined as not being gripped by the determiner 81A, the measurement value of the proximity sensor with this region as the detection target region becomes a value reflecting the environmental state around the steering wheel 2. Therefore, the capacitance threshold setter 82A sets the sensor among the plurality of proximity sensors 4A, 5A, 6A, 7A with the region determined as not being gripped by the determiner 81A as the detection target region as the correction sensor, and sets the reference value based on the filter value Ch_C_d_f of the measurement value Ch_C_d from this correction sensor. Consequently, according to the steering device 1A, since it is possible to make the difference between the reference value Ch_0 and each measurement value Ch_R_d, Ch_L_d, Ch_U_d, Ch_D_d irrespective of change in the environmental state around the steering wheel 2, it is possible to prevent misjudgment due to variation in the environmental state around the steering wheel 2, and thus can contribute to the development of a sustainable transportation system. In addition, with the steering device 1A, since there is no need for providing a sensor for detecting the environmental state around the steering wheel 2, it is possible to prevent misjudgment with a simpler configuration than conventional.

(5) The capacitance threshold setter 82A can make the difference between the reference value Ch_0 and each measurement value Ch_R_d, Ch_L_d, Ch_U_d, Ch_D_d constant irrespective of a change in environmental state around the steering wheel 2 by setting the reference value Ch_0 so as to be equal to the filter value Ch_C_d_f of the measurement value Ch_C_d from the correction sensor; therefore, it is possible to prevent misjudgment due to variation in the environmental state around the steering wheel 2.

(6) The determiner 81A determines the presence/absence of gripping of the steering wheel 2 based on the difference between the grip determination threshold Ch_th and the capacitance differential value ΔCh_R, ΔCh_L, ΔCh_U, ΔCh_D obtained by subtracting the reference value Ch_0 from each measurement value Ch_R_d, Ch_L_d, Ch_U_d, Ch_D_d. Consequently, according to the steering device 1A, since it is possible to make each capacitance differential value ΔCh_R, ΔCh_L, ΔCh_U, ΔCh_D constant irrespective of a change in environmental state around the steering wheel 2, it is possible to determine the presence/absence of gripping precisely.

In the above way, the present embodiment explains a case of the capacitance threshold setter 82A making the grip determination threshold Ch_th constant and changing the reference value Ch_0 according to the variation in environmental state; however, the present invention is not limited thereto. The capacitance threshold setter 82A may make the reference value Ch_0 constant and change the grip determination threshold Ch_th according to the variation in environmental state. It should be noted that, at this time, the timing and width of changing the grip determination threshold Ch_th are the same as the timing and width of changing the reference value Ch_0 in the reference value setting processing shown in FIG. 6; therefore, a detailed explanation is omitted. In this case, since it is possible to make the difference between each capacitance differential value ΔCh_R, ΔCh_L, ΔCh_U, ΔCh_D and grip determination threshold Ch_th constant irrespective of a change in the environmental state around the steering wheel 2, it is possible to determine the presence/absence of gripping precisely, similarly to the above-mentioned embodiment.

In addition, in the above-mentioned embodiment, although four proximity sensors 4A to 7A are arranged on the rim part 20, the number of proximity sensors arranged on the rim part 20 is not limited thereto. So long as two or more proximity sensors are arranged on the rim part 20, the present invention can be applied.

Third Embodiment

Next, a steering device according to a third embodiment of the present invention will be explained while referencing the drawings. It should be noted that, in the following explanation, configurations identical to the steering device according to the second embodiment are assigned the same reference symbol, and detailed explanations thereof are omitted.

Figure 7:
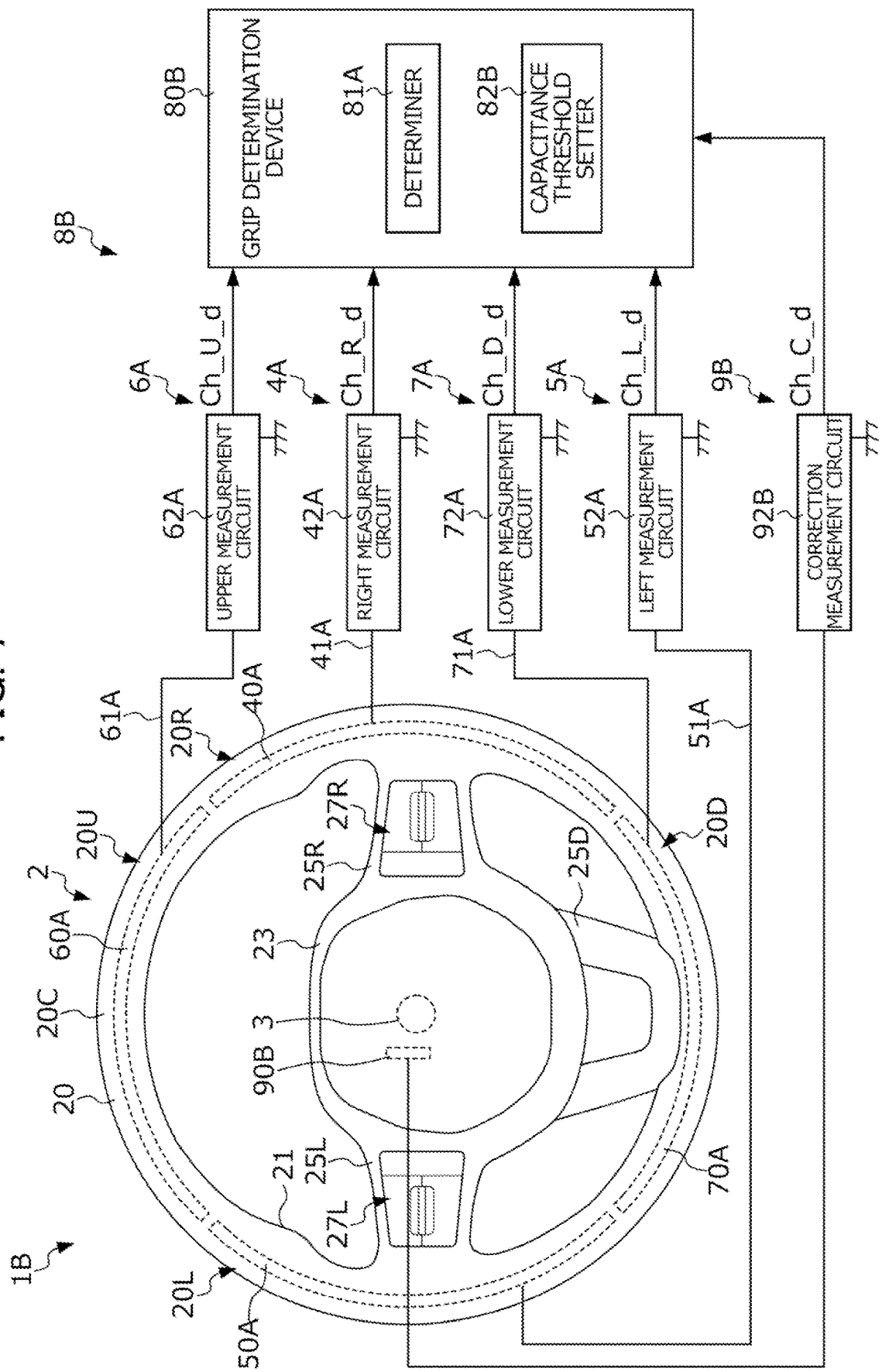
FIG. 7 is a view showing the configuration of a steering device according to a third embodiment of the present invention.

FIG. 7 is a view showing the configuration of a steering device 1B according to the present embodiment. The steering device 1B according to the present embodiment differs from the steering device 1A according to the second embodiment in the configuration of a grip sensor unit 8B.

The grip sensor unit 8B includes: a plurality (four in the present embodiment) of proximity sensors 4A, 5A, 6A, 7A having respectively different detection target regions; a correction sensor 9B having a different detection target region than the above-mentioned proximity sensors 4A to 7A; and a grip determination device 80B which determines the presence/absence of gripping and the gripping position of the steering wheel 2 by the driver based on the measurement results by these proximity sensors 4A to 7A and correction sensor 9B.

The correction sensor 9B includes: a correction electrode 90B provided to the steering wheel 2; and a correction measurement circuit 92B electrically connected with this correction electrode 90B. The correction electrode 90B is rectangular and is electrically conductive. The correction electrode 90B is provided at a position on the steering wheel 2 which cannot be gripped by the driver. The present embodiment explains a case of the correction electrode 90B provided near the base of the steering shaft 3 on the back side of the hub part 23 of the steering wheel 2; however, the present invention is not limited thereto. The correction electrode 90B may be provided anywhere so long as being a position which is on or near the steering wheel 2 and cannot be gripped by the driver.

The correction measurement circuit 92B is connected with the correction electrode 90B via a wire 91B. The correction measurement circuit 92B measures the electrostatic capacitance between the correction electrode 90B and ground. The measurement value Ch_C_d of electrostatic capacitance by the correction electrode 90B is sent to the grip determination device 80B. It should be noted that, since the circuit configuration of the correction measurement circuit 92B is substantially the same as the circuit configuration of the measurement circuit 42 according to the first embodiment, a detailed explanation is omitted.

In the above way, the correction electrode 90B is provided to the back side of the hub part 23 which cannot be gripped by the driver of the steering wheel 2. For this reason, the correction sensor 9B establishes the back side of the hub part 23 as the detection target region.

The grip determination device 80B includes: a determiner 81A which determines the presence/absence of gripping by the driver for every detection target region, based on the difference or comparison between the measurement values Ch_R_d, Ch_L_d, Ch_U_d, Ch_D_d of each proximity sensor 4A to 7A, and the capacitance threshold for the electrostatic capacitance such as the reference value Ch_0 or grip determination threshold Ch_th; and the capacitance threshold setter 82B which sequentially sets the capacitance threshold referenced upon determining the presence/absence of gripping in the determiner 81A, based on the measurement value Ch_C_d of the correction sensor 9B.

The capacitance threshold setter 82B changes both or either of the reference value Ch_0 and grip determination threshold Ch_th according to variation in the environmental state. It should be noted that the present embodiment explains a case of the capacitance threshold setter 82B varying the reference value Ch_0 according to variation in the environmental state, and setting the grip determination threshold Ch_th as a fixed value.

FIG. 8 is a flowchart showing a specific sequence of reference value setting processing of setting the reference value Ch_0. The reference value setting processing shown in FIG. 8 is repeatedly executed for every predetermined control cycle Δt in the capacitance threshold setter 82B.

First, in Step ST21, the capacitance threshold setter 82B acquires the measurement value Ch_C_d(n) of the correction sensor 9B, and then advances to Step ST22.

In Step ST22, the capacitance threshold setter 82B conducts filter processing for removing high-frequency noise by the same sequence as the first embodiment, on the measurement value Ch_C_d(n) of the correction sensor 9B acquired in Step ST21, and then advances to Step ST23. It should be noted that, hereinafter, the value obtained by conducting filter processing on the measurement value Ch_C_d(n) of the correction sensor is referred to as filter value, and is noted as "Ch_C_d_f(n)".

In Step ST23, the capacitance threshold setter 82B sets the reference value Ch_0(n) to a value equal to the filter value Ch_C_d_f(n) of the measurement value of the correction sensor, as shown in the following Formula (14), and then returns to Step ST11.

$$Ch\_0(n)=Ch\_C\_d\_f(n) \quad (14)$$

In the above way, the capacitance threshold setter 82B can change the reference value Ch_0 in response to variation in the environmental state around the electrodes 40A, 50A, 60A, 70A, by setting the reference value Ch_0 based on the measurement value Ch_C_d of the correction sensor 9B with the region of the steering wheel 2 which cannot be gripped by the driver as the detection target region.

In the above way, in the present embodiment, the capacitance threshold setter 82B sets the reference value Ch_0(n) so as to be equal to the filter value Ch_C_d_f(n) of the measurement value Ch_C_d(n) of the correction sensor; however, the present invention is not limited thereto. The capacitance threshold setter 82B may set the reference value Ch_0(n) so as to be equal to the measurement value Ch_C_d(n) of the correction sensor prior to conducting filter processing.

(7) The steering device 1B includes: the proximity sensors 4A, 5A, 6A, 7A measuring the electrostatic capacitance of the plurality of electrodes 40A, 50A, 60A, 70A provided to the steering wheel 2; the correction sensor 9B which measures the electrostatic capacitance of the correction electrode 90B provided on or near the steering wheel 2 and at a position which cannot be gripped by the driver; and the grip determination device 80B which determines the presence/absence of gripping of the steering wheel 2 based on the measurement values by the proximity sensors 4A to 7A and correction sensor 9B. Herein, although the measurement values Ch_R_d, Ch_L_d, Ch_U_d, Ch_D_d of the proximity sensors 4A to 7A increase when the driver grips the steering wheel 2, and thus the difference between the reference value Ch_0 and measurement values Ch_R_d, Ch_L_d, Ch_U_d, Ch_D_d also increases, the measurement value Ch_C_d of the correction sensor 9B hardly changes. For this reason, with the steering device 1B, it is possible to determine the presence/absence of gripping of the steering wheel 2 based on the difference between the reference value Ch_0 and the measurement values Ch_R_d, Ch_L_d, Ch_U_d, Ch_D_d. Herein, when the environmental state around the steering wheel 2 changes, the measurement values of the electrostatic capacitance by these proximity sensors 4A to 7A and correction sensor 9B also change. At this time, the measurement value Ch_C_d of the correction sensor 9B becomes a value reflecting the environmental state around the steering wheel 2. Therefore, the capacitance threshold setter 82B sets the reference value Ch_0 based on the measurement value Ch_C_d by the correction sensor 9B. Consequently, according to the steering device 1B, since it is possible to make the difference between the reference value Ch_0 and measurement values Ch_R_d, Ch_L_d, Ch_U_d, Ch_D_d by the proximity sensors 4A to 7A constant irrespective of a change in the environmental state around the steering wheel 2, it is possible to prevent misjudgment due to variation in the environmental state around the steering wheel 2, and thus possible to contribute to the development of a sustainable transportation system. In addition, since the steering device 1B has no need to provide a sensor for detecting the environmental state around the steering wheel 2, it is possible to prevent misjudgment with a simpler configuration than conventional.

(8) Since the capacitance threshold setter 82B can make the difference between the reference value Ch_0 and the measurement values Ch_R_d, Ch_L_d, Ch_U_d, Ch_D_d from the proximity sensors 4A to 7A constant irrespective of change in the environmental state around the steering wheel 2, by setting the reference value Ch_0 so as to be equal to the measurement value Ch_C_d from the correction sensor 9B, it is possible to prevent misjudgment due to variation in the environmental state around the steering wheel 2.

(9) The determiner 81B determines the presence/absence of gripping of the steering wheel 2 based on the difference between the grip determination threshold Ch_th and the capacitance differential value $\Delta Ch\_R$, $\Delta Ch\_L$, $\Delta Ch\_U$, $\Delta Ch\_D$ obtained by subtracting the reference value Ch_0 from each measurement value Ch_R_d, Ch_L_d, Ch_U_d, Ch_D_d. Consequently, according to the steering device 1B, since it is possible to make each capacitance differential value $\Delta Ch\_R$, $\Delta Ch\_L$, $\Delta Ch\_U$, $\Delta Ch\_D$ constant irrespective of change in the environmental state around the steering wheel 2, it is possible to determine the presence/absence of gripping precisely.

In the above way, the present embodiment explains a case of the capacitance threshold setter 82B making the grip determination threshold Ch_th constant and changing the reference value Ch_0 according to variation in the environmental state; however, the present invention is not limited thereto. The capacitance threshold setter 82B may make the reference value Ch_0 constant and change the grip determination threshold value Ch_th according to the variation in environmental state. It should be noted that, at this time, the timing and width of changing the grip determination threshold Ch_th are the same as the timing and width of changing the reference value Ch_0 in the reference value setting processing shown in FIG. 8; therefore, a detailed explanation is omitted. In this case, since it is possible to make the difference between the grip determination threshold Ch_th and each capacitance differential value $\Delta Ch\_R$, $\Delta Ch\_L$, $\Delta Ch\_U$, $\Delta Ch\_D$ constant irrespective of change in the environmental state around the steering wheel 2, it is possible to determine the presence/absence of gripping precisely, similarly to the above embodiments.

In addition, although the above embodiments arrange four proximity sensors 4A to 7A on the rim part 20, the number of proximity sensors arranged on the rim part 20 is not limited thereto. So long as one or more proximity sensors are arranged on the rim part 20, the present invention can be applied.

What is claimed is:

1. A steering device comprising: a steering wheel which accepts a steering operation of a vehicle by a driver;
a measurement device which measures an electrostatic capacitance of an electrode provided to the steering wheel; and
a grip determination device which determines presence/absence of gripping of the steering wheel based on a measurement value from the measurement device,
wherein the grip determination device includes a capacitance threshold setter which sets a capacitance threshold for electrostatic capacitance of the electrode; and a determiner which determines presence/absence of gripping of the steering wheel based on a difference or comparison between the measurement value and the capacitance threshold, and
wherein the capacitance threshold setter changes the capacitance threshold according to a change amount of the measurement value when the absolute value for slope of the measurement value is less than a predetermined slope threshold.

2. The steering device according to claim 1, wherein the capacitance threshold setter
increases the capacitance threshold in a case of an absolute value for slope of the measurement value in a predetermined determination period being less than the slope threshold and the measurement value increasing in the determination period;
decreases the capacitance threshold in a case of the absolute value for slope of the measurement value in the predetermined period being less than the slope threshold and the measurement value decreasing in the determination period; and
maintains the capacitance threshold constant in a case of the absolute value for the slope of the measurement value in the determination period being at least the slope threshold.

3. The steering device according to claim 2, wherein the determiner determines presence/absence of gripping of the steering wheel based on a capacitance differential value obtained by subtracting a reference value which is the capacitance threshold from the measurement value.

4. The steering device according to claim 2, wherein the determiner determines presence/absence of gripping of the steering wheel by comparing the measurement value and a grip determination threshold which is the capacitance threshold.

5. The steering device according to claim 1, wherein the determiner determines presence/absence of gripping of the steering wheel based on a capacitance differential value obtained by subtracting a reference value which is the capacitance threshold from the measurement value.

6. The steering device according to claim 1, wherein the determiner determines presence/absence of gripping of the steering wheel by comparing the measurement value and a grip determination threshold which is the capacitance threshold.

* * * * *